US009324465B2

(12) United States Patent
Splichal, Jr.

(10) Patent No.: US 9,324,465 B2
(45) Date of Patent: Apr. 26, 2016

(54) METHODS AND APPARATUSES FOR OPERATING NUCLEAR REACTORS AND FOR DETERMINING POWER LEVELS IN THE NUCLEAR REACTORS

(75) Inventor: William Francis Splichal, Jr., San Jose, CA (US)

(73) Assignee: GE-HITACHI NUCLEAR ENERGY AMERICAS LLC, Wilmington, NC (US)

(*) Notice: Subject to any disclaimer, the term of this patent is extended or adjusted under 35 U.S.C. 154(b) by 846 days.

(21) Appl. No.: 12/385,200

(22) Filed: Apr. 1, 2009

(65) Prior Publication Data

US 2010/0254505 A1    Oct. 7, 2010

(51) Int. Cl.
| | |
|---|---|
| G01C 17/00 | (2006.01) |
| G21C 17/108 | (2006.01) |
| G01C 7/00 | (2006.01) |
| G01T 3/00 | (2006.01) |

(52) U.S. Cl.
CPC ..................... *G21C 17/108* (2013.01)

(58) Field of Classification Search
CPC ..................................... G21C 17/108
USPC ................... 376/207, 154, 145, 254, 245
See application file for complete search history.

(56) References Cited

U.S. PATENT DOCUMENTS

| | | | | |
|---|---|---|---|---|
| 3,915,018 | A | * | 10/1975 | Karplus ......................... 73/647 |
| 4,404,164 | A | * | 9/1983 | Kopp et al. ................... 376/154 |
| 4,520,418 | A | * | 5/1985 | Susi .............................. 361/92 |
| 4,580,056 | A | * | 4/1986 | Kaiser et al. ............. 250/390.01 |
| 4,634,568 | A | * | 1/1987 | Wimpee et al. ............... 376/154 |
| 4,766,386 | A | * | 8/1988 | Oliver et al. .................. 324/533 |
| 4,963,315 | A |   | 10/1990 | Bednar et al. |
| 5,787,138 | A |   | 7/1998 | Ocieczek et al. |
| 8,532,244 | B2 |   | 9/2013 | Brisson et al. |

(Continued)

FOREIGN PATENT DOCUMENTS

| | | |
|---|---|---|
| EP | 2 053 614 | 1/2013 |
| EP | 2 166 542 | 9/2013 |

(Continued)

OTHER PUBLICATIONS

Talnagi et al, "An assessment of neutron sensor channel in-situ performance testing methods", IEEE Transactions on Nuclear Science, vol. NS-32, No. 1, Feb. 1985.*

(Continued)

*Primary Examiner* — Frank J McGue
(74) *Attorney, Agent, or Firm* — Harness, Dickey & Pierce, P.L.C.

(57) ABSTRACT

An apparatus may include two or more electrical conductors, one or more signal devices, and an analyzer. The one or more signal devices may be adapted to apply one or more signals to the two or more electrical conductors and receive one or more signals from the two or more electrical conductors. The analyzer may be adapted to determine power level in the nuclear reactor using at least one of the applied signals and at least one of the received signals. A method of determining power level in a nuclear reactor may include: measuring impedance values of two or more electrical conductors disposed in the nuclear reactor and using the measured impedance values to determine the power level. A method of operating a nuclear reactor may include: measuring the impedance values and using the measured impedance values to determine parameters of the nuclear reactor.

13 Claims, 16 Drawing Sheets

(56) References Cited

U.S. PATENT DOCUMENTS

| | | | | |
|---|---|---|---|---|
| 2003/0020898 A1* | 1/2003 | Wyar | ............... | G01R 31/11 356/73.1 |
| 2007/0273619 A1* | 11/2007 | Kitazawa et al. | ............... | 345/76 |
| 2008/0310576 A1* | 12/2008 | Brisson et al. | ............... | 376/258 |
| 2010/0067643 A1* | 3/2010 | Tan et al. | ............... | 376/255 |

FOREIGN PATENT DOCUMENTS

| | | |
|---|---|---|
| JP | 61-53586 | 3/1986 |
| JP | H-3-8059 | 2/1991 |
| JP | 08-54469 | 2/1996 |
| JP | 09-274095 | 10/1997 |
| JP | 2005529317 A | 9/2005 |
| JP | 2006-309792 | 12/2008 |
| JP | 2010-71975 | 2/2010 |
| WO | 03095954 A1 | 11/2003 |

OTHER PUBLICATIONS

Japanese Office Action dated Feb. 25, 2014 issued in corresponding JP Application No. 2010-017527 (with translation).
J.W. Talnagi, D.W. Miller, S.A. Arndt, An Assessment of Neutron Sensor Channel in-Situ Performance Testing Methods, IEEE Transactions on Nuclear Science, Feb. 1985, vol. NS-32, No. 1, 1025-1029.
Unofficial English translation of Japanese Office Action issued in connection with corresponding JP Application No. 2010-017527 on Jan. 6, 2015.
Amendment dated Mar. 12, 2015 in U.S. Appl. No. 12/283,796 to Tan, with Declaration Under 37 CFR 1.132 and amendments to the specification.
European Search Report in corresponding European Patent Application No. 10152051.8, dated Jan. 5, 2016.

\* cited by examiner

FIG. 10

| Node No. | Position From Bottom of Reactor Core (meters) | Calculated Node Value of Relative Reactor Power (arbitrary units) |
|---|---|---|
| 1 | 0.1472 | 193 |
| 2 | 0.2944 | 306 |
| 3 | 0.4416 | 395 |
| 4 | 0.5888 | 443 |
| 5 | 0.7360 | 489 |
| 6 | 0.8832 | 529 |
| 7 | 1.0304 | 566 |
| 8 | 1.1776 | 595 |
| 9 | 1.3248 | 628 |
| 10 | 1.4720 | 650 |
| 11 | 1.6192 | 667 |
| 12 | 1.7664 | 675 |
| 13 | 1.9136 | 688 |
| 14 | 2.0608 | 697 |
| 15 | 2.2080 | 701 |
| 16 | 2.3552 | 709 |
| 17 | 2.5024 | 722 |
| 18 | 2.6496 | 727 |
| 19 | 2.7968 | 726 |
| 20 | 2.9440 | 716 |
| 21 | 3.0912 | 686 |
| 22 | 3.2384 | 632 |
| 23 | 3.3856 | 549 |
| 24 | 3.5328 | 424 |
| 25 | 3.6800 | 335 |

FIG. 12

| Position From Bottom of Reactor Core (meters) | Specific Characteristic Impedance $Z_S$ (ohms) | Change in Specific Characteristic Impedance $Z_S$, $\Delta Z_S$ (ohms) | Adjusted Value of Relative Reactor Power (arbitrary units) |
|---|---|---|---|
| 0.0 | 93.51 | 0.00 | 0 |
| 0.2 | 92.86 | 0.65 | 179 |
| 0.4 | 92.29 | 1.22 | 339 |
| 0.6 | 91.96 | 1.55 | 432 |
| 0.8 | 91.64 | 1.87 | 521 |
| 1.0 | 91.48 | 2.03 | 566 |
| 1.2 | 91.32 | 2.19 | 611 |
| 1.4 | 91.24 | 2.27 | 633 |
| 1.6 | 91.16 | 2.35 | 656 |
| 1.8 | 91.08 | 2.43 | 678 |
| 2.0 | 91.00 | 2.51 | 700 |
| 2.2 | 91.00 | 2.51 | 700 |
| 2.4 | 91.00 | 2.51 | 700 |
| 2.6 | 90.92 | 2.59 | 723 |
| 2.8 | 90.92 | 2.59 | 723 |

METHODS AND APPARATUSES FOR OPERATING NUCLEAR REACTORS AND FOR DETERMINING POWER LEVELS IN THE NUCLEAR REACTORS

This invention was made with Government support under contract #DE-FC07-05ID14635 awarded by DOE. The Government has certain rights in this invention.

BACKGROUND

1. Field

Example embodiments relate to methods and apparatuses for operating nuclear reactors and for determining power levels in the nuclear reactors. Also, example embodiments relate to methods and apparatuses for operating nuclear reactors and for determining power levels in the nuclear reactors that may include two or more electrical conductors, one or more signal devices, and/or an analyzer.

2. Description of Related Art

FIG. 1 is a sectional view, with parts cut away, of reactor pressure vessel ("RPV") 100 in a related art boiling water reactor ("BWR"). During operation of the BWR, coolant water circulating inside RPV 100 is heated by nuclear fission produced in core 102. Feedwater is admitted into RPV 100 via feedwater inlet 104 and feedwater sparger 106 (a ring-shaped pipe that includes apertures for circumferentially distributing the feedwater inside RPV 100). The feedwater from feedwater sparger 106 flows down through downcomer annulus 108 (an annular region between RPV 100 and core shroud 110).

Core shroud 110 is a stainless steel cylinder that surrounds core 102. Core 102 includes a multiplicity of fuel bundle assemblies 112 (two 2×2 arrays, for example, are shown in FIG. 1). Each array of fuel bundle assemblies 112 is supported at or near its top by top guide 114 and at or near its bottom by core plate 116. Top guide 114 provides lateral support for the top of fuel bundle assemblies 112 and maintains correct fuel-channel spacing to permit control rod insertion.

The coolant water flows downward through downcomer annulus 108 and into core lower plenum 118. The coolant water in core lower plenum 118 in turn flows up through core 102. The coolant water enters fuel assemblies 112, wherein a boiling boundary layer is established. A mixture of water and steam exits core 102 and enters core upper plenum 120 under shroud head 122. Core upper plenum 120 provides standoff between the steam-water mixture exiting core 102 and entering standpipes 124. Standpipes 124 are disposed atop shroud head 122 and in fluid communication with core upper plenum 120.

The steam-water mixture flows through standpipes 124 and enters steam separators 126 (which may be, for example, of the axial-flow, centrifugal type). Steam separators 126 substantially separate the steam-water mixture into liquid water and steam. The separated liquid water mixes with feedwater in mixing plenum 128. This mixture then returns to core 102 via downcomer annulus 108. The separated steam passes through steam dryers 130 and enters steam dome 132. The dried steam is withdrawn from RPV 100 via steam outlet 134 for use in turbines and other equipment (not shown).

The BWR also includes a coolant recirculation system that provides the forced convection flow through core 102 necessary to attain the required power density. A portion of the water is sucked from the lower end of downcomer annulus 108 via recirculation water outlet 136 and forced by a centrifugal recirculation pump (not shown) into a plurality of jet pump assemblies 138 (only one of which is shown) via recirculation water inlets 140. Jet pump assemblies 138 are circumferentially distributed around core shroud 110 and provide the required reactor core flow.

As shown in FIG. 1, a related art jet pump assembly 138 includes a pair of inlet mixers 142. A related art BWR includes 16 to 24 inlet mixers 142. Each inlet mixer 142 has an elbow 144 welded to it that receives water from a recirculation pump (not shown) via inlet riser 146. An example inlet mixer 142 includes a set of five nozzles circumferentially distributed at equal angles about the axis of inlet mixer 142. Each nozzle is tapered radially inwardly at its outlet. Jet pump assembly 138 is energized by these convergent nozzles. Five secondary inlet openings are radially outside of the nozzle exits. Therefore, as jets of water exit the nozzles, water from downcomer annulus 108 is drawn into inlet mixer 142 via the secondary inlet openings, where it is mixed with coolant water from the recirculation pump. The coolant water then flows into jet pump assembly 138.

FIG. 2 is a top plan view of a related art core 200. Core 200 may include fuel bundles 202, peripheral fuel bundles 204, and/or control rods 206. Two or more of fuel bundles 202 may be included in fuel bundle assemblies 208. Core 200 may include, for example, hundreds or thousands of fuel bundles 202 and/or tens or hundreds of peripheral fuel bundles 204. As shown in FIG. 2, for example, core 200 may include approximately one thousand and twenty-eight (1,028) fuel bundles 202, approximately one hundred and four (104) peripheral fuel bundles 204, and/or approximately two hundred and sixty-nine (269) control rods 206.

The distribution of fuel bundles 202, peripheral fuel bundles 204, and/or control rods 206 in core 200 may or may not be symmetric. Additionally, if symmetry exists, it may include one or more of mirror-image symmetry, diagonal symmetry, rotational symmetry, translational symmetry, quadrant symmetry, and octant symmetry. As shown in FIG. 2, for example, one or more control rods 206 may be disposed in or near a geometric center of core 200.

Core 200 also may include one or more types of neutron monitors. These monitors may include, for example, one or more source range monitors, one or more intermediate range monitors, and/or one or more power range monitors. In a related art BWR, the one or more source range monitors may be fixed or movable. Similarly, in a related art BWR, the one or more intermediate range monitors may be fixed or movable.

At least some of the overall range of a related art source range monitor and/or a related art intermediate range monitor may be covered by a startup range neutron monitor ("SRNM") or wide range neutron monitor ("WRNM"). Similarly, at least some of the overall range of a related art intermediate range monitor and/or a related art power range monitor may be covered by a local power range monitor ("LPRM"). In a related art BWR, the SRNMs and/or the LPRMs may be fixed.

Core 200 may include, for example, tens of SRNM detectors and/or tens or hundreds of LPRM detectors. Although not shown in FIG. 2, core 200 may include, for example, approximately twelve (12) SRNM detectors. As shown in FIG. 2, for example, core 200 may include approximately two hundred and fifty-six (256) LPRM detectors in approximately sixty-four (64) LPRM assemblies 210. For example, one or more LPRM assemblies 210 may include four LPRM detectors (i.e., each LPRM assembly 210 may include four LPRM detectors).

FIG. 3 is a side elevation view of a related art LPRM assembly 300. As shown in FIG. 3, guide tube 302 of LPRM assembly 300 may penetrate core plate 304, allowing LPRM assembly 300 access into core 306. One or more guide rings 308 of LPRM cover tube 310 may guide the insertion of LPRM assembly 300 into guide tube 302. Guide tube 302 may be sealed by gland seal 312 and/or flange 314.

LPRM assembly 300 may include, for example, four LPRM detectors (not shown) and/or six connectors. First connector 316 may connect to a first LPRM detector, second connector 318 may connect to a second LPRM detector, third connector 320 may connect to a third LPRM detector, and/or fourth connector 322 may connect to a fourth LPRM detector. One or more of first connector 316, second connector 318, third connector 320, and fourth connector 322 may be a connector manufactured by the LEMO company, based in Switzerland, and known as a LEMO plug or LEMO receptacle. For example, one or more of first connector 316, second connector 318, third connector 320, and fourth connector 322 may be a size 1 LEMO receptacle.

Fifth connector 324 may connect to a gamma thermometer (not shown) of LPRM assembly 300. Fifth connector 324 may be, for example, a size 3 LEMO plug. Sixth connector 326 may be, for example, a calibration tube associated with a traversing in-core probe ("TIP") (not shown).

A TIP is a gamma- or neutron-sensitive device that may be fully inserted into a nuclear reactor core, then withdrawn in a measured manner to determine the gamma or neutron flux at axial elevations in the core. TIP readings are continuous, but typically are digitized at set intervals (e.g., 1") and then combined into one value representative of the power in a node (e.g., a 6" segment). Since in-core structures such as spacers may affect the local gamma or neutron flux, dips in power may be correlated with known spacer locations to enhance proper alignment of the data. At the beginning of a TIP set, all TIPS (typically from 3 to 5) may be run through a common core radial location to allow the different TIPs to be normalized to each other. Data collected from each radial location around the core may then be normalized. This is commonly called "core adaption" and is generally no longer used. Instead, core physics computer programs may calculate the core radial power distribution, and the TIP readings may be used to allocate the power axially in each location. This process is commonly called "shape adaption." For this process, it may be necessary that each TIP read consistently from top to bottom in each location, but not necessarily consistently from one radial location to another. In other words, inter-calibration of instruments may not be required for shape adaption.

In related art LPRM assembly 300, the first, second, third, and fourth LPRM detectors may be disposed in a substantially vertical arrangement. The substantially vertical arrangement may include spacing between the first, second, third, and fourth LPRM detectors. The spacing may be of the same size, or two or more different sizes. The substantially vertical arrangement may be, for example, approximately the same in each LPRM assembly 300. The substantially vertical arrangement may allow the first, second, third, and fourth LPRM detectors to monitor neutron flux (typically thermal neutron flux) at four different heights (or locations) in core 306. The four different heights (or locations) may be, for example, approximately the same in each LPRM assembly 300.

As is known by a person having ordinary skill in the art ("PHOSITA"), LPRM detectors typically include a cathode having fissionable material coated on the cathode. The fissionable material may be a mixture of $U^{234}$ and $U^{235}$. The $U^{235}$ is used to provide a signal proportional to the thermal neutron flux. But due to the extremely high thermal neutron flux in the nuclear reactor core, the $U^{235}$ is subject to burnout, which may cause the LPRM detector reading corresponding to a constant thermal neutron flux to gradually decrease over time. The $U^{234}$ may absorb thermal neutrons to become $U^{235}$, lengthening the life of the LPRM detector. Eventually, however, the LPRM detector reading corresponding to a constant thermal neutron flux will still gradually decrease over time.

A gamma thermometer may provide a capability to calibrate an associated LPRM detector. During steady-state operation, gamma flux typically is proportional to thermal neutron flux. Thus, a gamma thermometer—located near the associated LPRM detector—can measure local gamma flux during a steady-state heat balance, as known to a PHOSITA. The local gamma flux can be related to the proportional thermal neutron flux and the associated LPRM detector can be calibrated based on the related proportional thermal neutron flux. Currently, however, gamma thermometer technology is expensive and/or may provide a relatively limited number of temperature-compensation measurements over the height of core 306.

Although older technology than the gamma thermometer, a TIP can provide an alternate and/or supplemental vehicle to calibrate LPRM detectors. As known to a PHOSITA, a TIP essentially is a system that includes a mobile thermal neutron detector that may be temporarily positioned near an LPRM detector to be calibrated. During a steady-state heat balance, for example, the LPRM detector can be calibrated to the reading of the mobile thermal neutron detector. Because the TIP is mobile, it can be moved out of the extremely high thermal neutron flux in the nuclear reactor core. Thus, a TIP normally is not subject to the burnout problems of the LPRM detectors. However, TIPs are complex systems that are subject to mechanical and electrical failure, require frequent maintenance and repair, and raise numerous radiation exposure and contamination issues.

Various solutions to the problem of determining power levels in nuclear reactors have been proposed, as discussed, for example, in U.S. Pat. No. 4,614,635 ("the '635 patent"), U.S. Pat. No. 4,725,399 ("the '399 patent"), U.S. Pat. No. 4,915,508 ("the '508 patent"), and U.S. Pat. No. 5,015,434 ("the '434 patent"). The disclosures of the '635 patent and the '434 patent are incorporated in the present application by reference. However, these various solutions do not include methods and apparatuses for operating nuclear reactors and for determining power levels in the nuclear reactors, wherein the compensation of LPRM detectors may be performed simply, with reduced cost, and/or with a relatively large number of compensation measurements over the height of the core.

SUMMARY

Example embodiments may relate to methods and apparatuses for operating nuclear reactors and for determining power levels in the nuclear reactors. Also, example embodiments relate to methods and apparatuses for operating nuclear reactors and for determining power levels in the nuclear reactors that may include two or more electrical conductors, one or more signal devices, and/or an analyzer. Additionally, power levels in the nuclear reactors may be determined using the two or more electrical conductors, one or more signal devices, and/or analyzer.

In an example embodiment, an apparatus may include two or more electrical conductors, one or more signal devices, and/or an analyzer. The two or more electrical conductors may be disposed in a nuclear reactor. The one or more signal devices may be adapted to apply one or more incident signals to the two or more electrical conductors. The one or more signal devices may be adapted to receive one or more reflected signals from the two or more electrical conductors. The analyzer may be adapted to determine power level in the nuclear reactor using at least one of the one or more applied incident signals and/or at least one of the one or more received reflected signals.

In another example embodiment, methods of determining power level in a nuclear reactor may include measuring impedance values of two or more electrical conductors disposed in the nuclear reactor and/or using the measured impedance values to determine the power level.

In yet another example embodiment, methods of operating a nuclear reactor may include measuring impedance values of two or more electrical conductors disposed in the nuclear reactor and/or using the measured impedance values to determine parameters of the nuclear reactor.

BRIEF DESCRIPTION OF THE DRAWINGS

The above and/or other aspects and advantages will become more apparent and more readily appreciated from the following detailed description of example embodiments taken in conjunction with the accompanying drawings, in which:

FIG. 10 is a table listing the results of relative reactor power versus vertical height calculations using a process computer associated with a core monitoring package;

FIG. 12 is a table listing the results of relative reactor power versus vertical height calculations for the nuclear reactor based on example embodiments.

DETAILED DESCRIPTION OF EXAMPLE EMBODIMENTS

Figure 1:
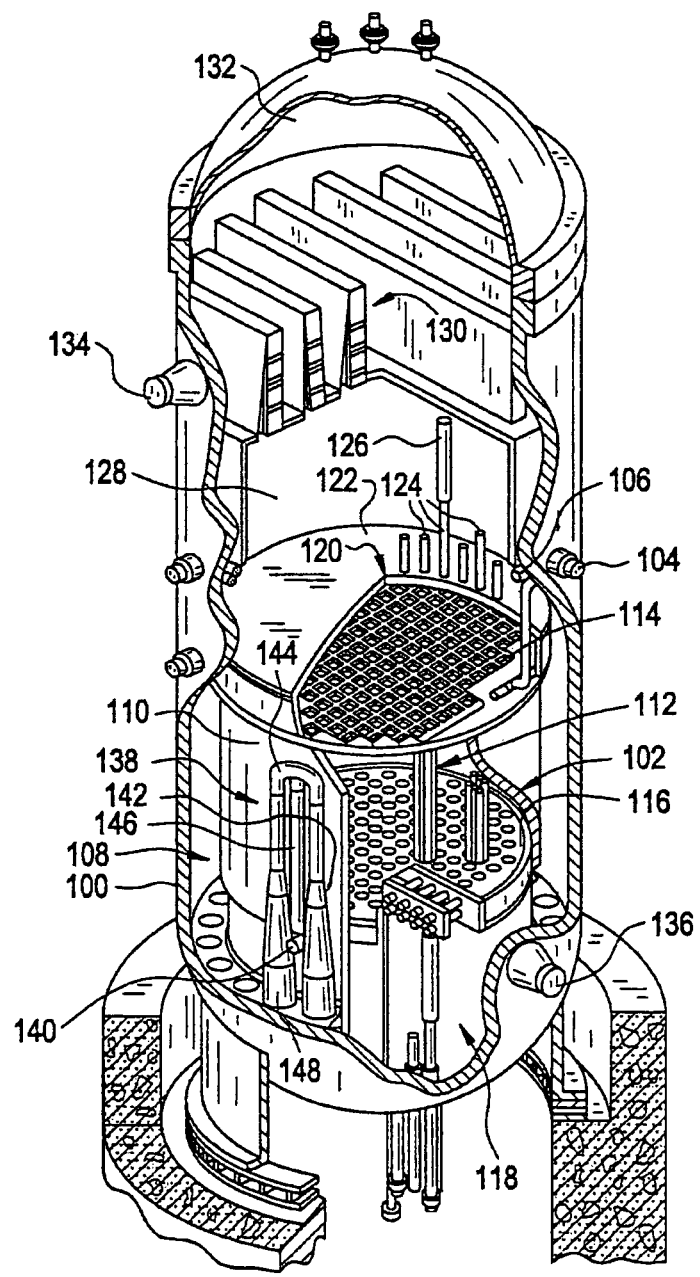
FIG. 1 is a sectional view, with parts cut away, of an RPV in a related art BWR.
Figure 2:
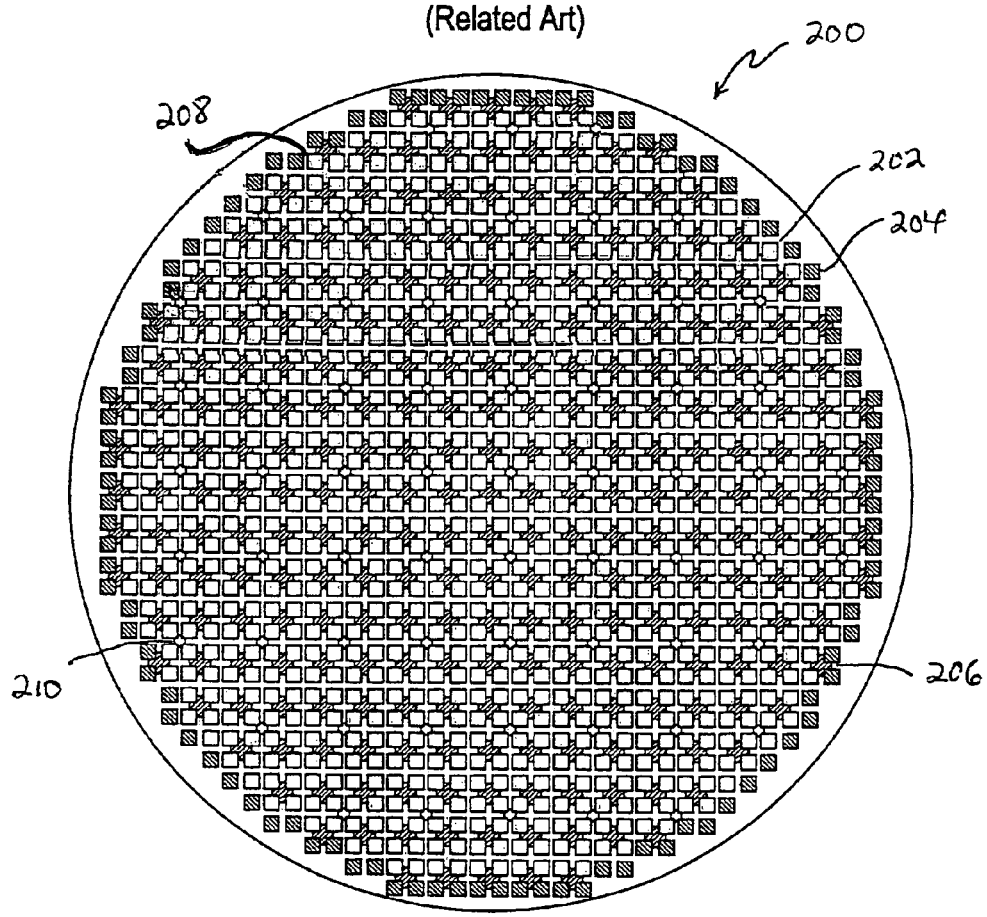
FIG. 2 is a top plan view of a related art nuclear reactor core.
Figure 3:
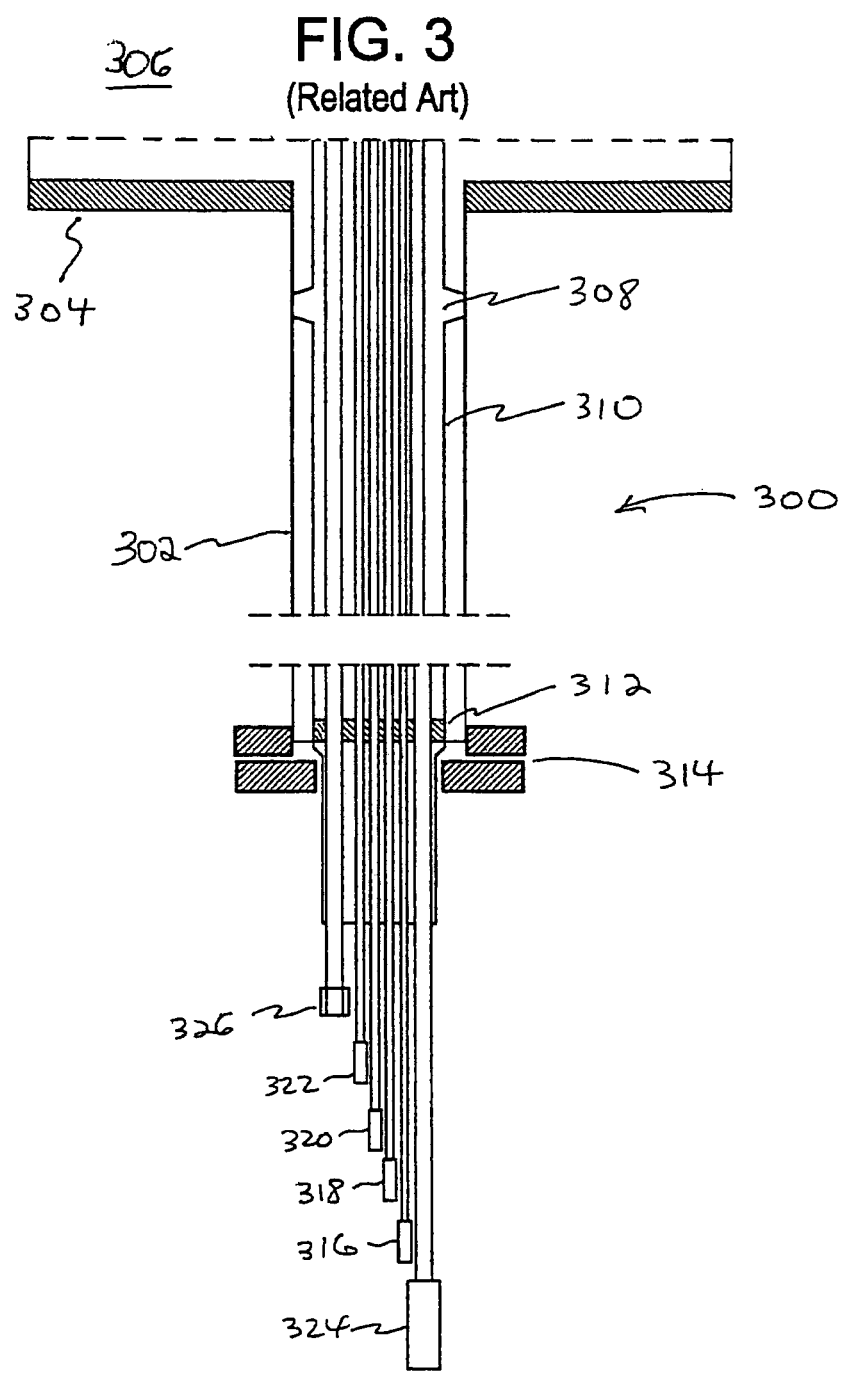
FIG. 3 is a side elevation view of a related art LPRM assembly.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art.

It will be understood that when a component is referred to as being "on," "connected to," "coupled to," or "fixed to" another component, it may be directly on, connected to, coupled to, or fixed to the other component or intervening components may be present. In contrast, when a component is referred to as being "directly on," "directly connected to," "directly coupled to," or "directly fixed to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the example embodiments.

Spatially relative terms, such as "beneath," "below," "lower," "above," "upper," and the like may be used herein for ease of description to describe one component and/or feature relative to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by a PHOSITA to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals refer to the like components throughout.

As discussed above, although the example embodiments are described in terms of BWRs, a PHOSITA should recognize that example embodiments also apply to other types of nuclear reactors such as, for example, other water-cooled and/or water-moderated reactors [e.g., pressurized water reactors ("PWR"), pool-type reactors, and heavy water reactors], gas-cooled reactors ("GCR") [e.g., advanced gas-cooled reactors ("AGR")], liquid-metal-cooled reactors, and molten-salt reactors ("MSR").

In example embodiments, apparatuses for determining power levels in a nuclear reactor may include two or more electrical conductors, one or more signal devices, and/or an analyzer. The two or more electrical conductors may be, for example, electrical conductors of a transmission line. The apparatuses may have, for example, no moving parts. The apparatuses may use, for example, all-electronic instrumentation.

In example embodiments, the two or more electrical conductors may be disposed partially or completely within the nuclear reactor. For example, the two or more electrical conductors may be disposed partially or completely within or near the nuclear reactor core.

In example embodiments, the two or more electrical conductors may be conductors of a coaxial cable (such a coaxial cable may be referred to, for example, as a transmission line). The coaxial cable may include an inner conductor (such an inner conductor may be referred to, for example, as a center conductor; the inner conductor may have, for example, a substantially cylindrical shape), an outer conductor (such an outer conductor may be referred to, for example, as a shield conductor; the outer conductor may have, for example, a substantially cylindrical shape), insulating dielectric material between the inner and outer conductors, and/or fill gas. The inner and outer conductors may share a same axis. The coaxial cable may be flexible (e.g., having a braided sheath) or substantially inflexible (e.g., having a solid sheath). Such substantially inflexible cables may be referred to as "rigid" and/or "hardline" cables by a PHOSITA.

In example embodiments, the coaxial cable may include one or more other components such as, for example, one or more layers inside the outer conductor and/or one or more layers outside the outer conductor (an outermost layer—often an insulating and/or damage-resistant layer—may be referred to as a "jacket").

Figure 4:
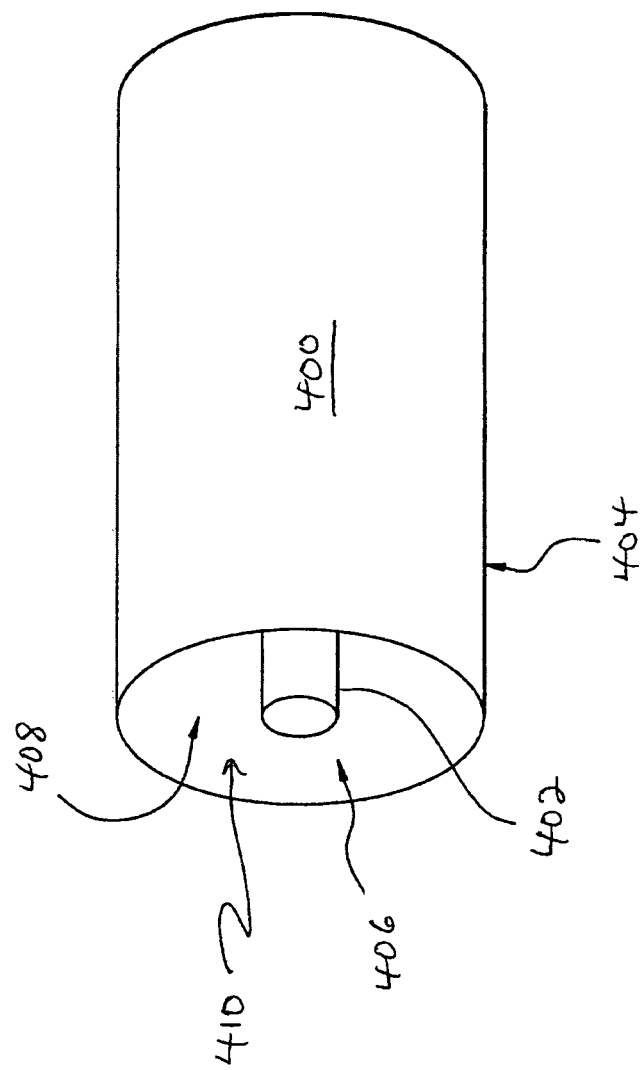
FIG. 4 is a perspective view of a coaxial cable according to example embodiments.

FIG. 4 is a perspective view of coaxial cable 400 according to example embodiments. Coaxial cable 400 may include inner conductor 402, outer conductor 404, gap 406 between inner conductor 402 and outer conductor 404, insulating dielectric material 408 disposed in gap 406, and/or fill gas 410.

Inner conductor 402 may be, for example, an electrical conductor of appropriate length (e.g., a wire with a substantially round cross-section or some other cross-section). In addition or in the alternative, inner conductor 402 may have a substantially round cross-section. Inner conductor 402 may be, for example, a hollow electrical conductor (e.g., tube) or a substantially solid electrical conductor. Inner conductor 402 may include, for example, one or more metals, one or more alloys, and/or one or more metal compositions. As defined herein, the term "metal" means an element selected from the group consisting of lithium, sodium, potassium, rubidium, cesium, beryllium, magnesium, calcium, scandium, yttrium, titanium, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, aluminum, gallium, indium, thallium, carbon, silicon, tin, lead, arsenic, antimony, bismuth, selenium, tellurium, lanthanum, cerium, praseodymium, neodymium, samarium, europium, gadolinium, terbium, dysprosium, holmium, erbium, thulium, ytterbium, lutetium, thorium, and uranium. As defined herein, the term "alloy" means a combination of multiple metals not in a fixed stoichiometric relationship. Examples include titanium 662 (titanium with about 6%-by-weight aluminum, about 6%-by-weight vanadium, and about 2%-by-weight tin) and titanium 64 (titanium with about 6%-by-weight aluminum and about 4%-by-weight vanadium). As defined herein, the term "metal composition" means a metal compound or an intermetallic compound. As defined herein, the term "metal compound" means a combination of more than one metal in a fixed stoichiometric relationship. Examples include lanthanum 3-nickel ($La_3Ni$), lanthanum-nickel 5 ($LaNi_5$), thorium-cobalt ($Th_7CO_3$), thorium-iron ($Th_7Fe_3$), thorium-manganese ($Th_6Mn_{23}$), thorium-nickel ($Th_2Ni_{17}$), and titanium-iron (TiFe). As defined herein, the term "intermetallic compound" means a combination of one or more metals with one or more nonmetals in a fixed stoichiometric relationship. Examples include barium titanate ($BaTiO_3$) and lithium-aluminum deuteride ($LiAlD_4$).

In example embodiments, inner conductor 402 may be a solid copper or stainless steel conductor having a substantially round cross-section, with a diameter of approximately 0.6 mm. For example, inner conductor 402 may have a diameter of 0.022+0.002 inches.

Similarly, outer conductor 404 may be, for example, a hollow electrical conductor (e.g., tube) of appropriate length. In addition or in the alternative, outer conductor 404 may have a substantially round cross-section. Outer conductor 404 may be, for example, a hollow sheath of a substantially solid or braided design. Outer conductor 404 may include, for example, one or more metals, one or more alloys, and/or one or more metal compositions.

In example embodiments, outer conductor 404 may be a hollow sheath of solid or braided aluminum, copper, silver, or stainless steel having a substantially round cross-section, with an inner diameter sized to achieve proper spacing relative to inner conductor 402 and/or as necessary to meet impedance requirements (e.g., an inner diameter of approximately 3 mm and/or an outer diameter of approximately 4 mm). In example embodiments, outer conductor 404 may be a hollow sheath with an inner diameter of approximately 2.7 mm and an outer diameter of approximately 4.3 mm. For example, outer conductor 404 may have a nominal inner diameter of 0.106 inches and/or outer conductor 404 may have a nominal outer diameter of 0.170+0.001 inches.

In example embodiments, outer conductor 404 may include an inner sheath and an outer sheath. For example, the inner sheath may have an inner diameter sized to achieve proper spacing relative to inner conductor 402 and/or as necessary to meet impedance requirements (e.g., a nominal inner diameter of 0.106 inches). For example, the outer sheath may have an outer diameter sized as necessary for design requirements (e.g., a nominal outer diameter of 0.170+0.001 inches).

In example embodiments, inner conductor 402 may be concentric with the inner sheath of outer conductor 404. For example, inner conductor 402 may be concentric with the inner sheath within 0.015 inches. Concentricity may be verified, for example, by radiography of samples from manufacturing lots.

In example embodiments, the inner and outer sheaths may be formed in intimate contact with each other. For example, the inner sheath may be metallurgically bonded to the outer sheath. In another example, the inner sheath may contact the outer sheath over all or substantially all of an outer surface of the inner sheath. In yet another example, the outer sheath may contact the inner sheath over all or substantially all of an inner surface of the outer sheath.

Gap 406 represents the physical separation between inner conductor 402 and outer conductor 404. In example embodiments, the width of gap 406 may be substantially constant. For example, if inner conductor 402 has a diameter of approximately 0.6 mm and outer conductor 404 has an inner diameter of approximately 2.7 mm, then gap 406 may have a width of approximately 1.05 mm. In another example, inner conductor 402 may have a diameter of 0.022 inches, while outer conductor 404 may have a nominal inner diameter of 0.106 inches, so that gap 406 may have a width of approximately 0.042 inches.

In example embodiments, insulating dielectric material 408 disposed in gap 406 may maintain the physical separation between inner conductor 402 and outer conductor 404. The nature and amount of insulating dielectric material 408 disposed in gap 406 may affect packing tightness of gap 406. At least partly as a result, insulating dielectric material 408 may impact various physical properties of coaxial cable 400, such as rigidity. Insulating dielectric material 408 may comprise, for example, a single insulating dielectric material, multiple insulating dielectric materials, or one or more composite insulating dielectric materials.

In example embodiments, insulating dielectric material 408 may include material able to withstand high temperatures, such as temperatures found in the core of a nuclear reactor. Insulating dielectric material 408 may have high electrical resistance (e.g., a volume resistivity of about $10^{14}$ ohm-cm at 25° C.). Insulating dielectric material 408 may impact various electrical properties of coaxial cable 400, such as characteristic impedance and attenuation. For example, insulating dielectric material 408 may comprise inorganic material. For example, insulating dielectric material 408 may include one or more various forms of ceramic, one or more various forms of glass, one or more various forms of steatite, one or more forms of porcelain, one or more metal oxides, and/or one or more gases. For example, insulating dielectric material 408 may include one or more of aluminum oxide ($Al_2O_3$), magnesium oxide (MgO), and silicon dioxide ($SiO_2$). For example, insulating dielectric material 408 may include silicon dioxide powder.

Coaxial cables, such as coaxial cable 400, are known to a PHOSITA.

In example embodiments, insulating dielectric material 408 may be solid, possibly in a form that promotes flexibility of coaxial cable 400. For example, insulating dielectric material 408 may be in the form of beads or powder. In example embodiments, insulating dielectric material 408 may include ceramic beads, aluminum oxide (possibly in powder form), magnesium oxide (possibly in powder form), and/or silicon dioxide (possibly in powder form).

In example embodiments, insulating dielectric material 408 may be loosely packed in order to promote flexibility of coaxial cable 400 and/or to promote distribution of fill gas 410.

In example embodiments, fill gas 410 may include noble gas. For example, fill gas 410 may include one or more of Helium (He), Neon (Ne), Argon (Ar), Krypton (Kr), Xenon (Xe), and Radon (Rn). The pressure (at ambient temperature) of fill gas 410 in coaxial cable 400 may be greater than or equal to about 5 atmospheres ("atm"), greater than or equal to about 10 atm, and/or greater than or equal to about 12.5 atm. In addition or in the alternative, the pressure (at ambient temperature) of fill gas 410 in coaxial cable 400 may be less than or equal to about 25 atm, less than or equal to about 20 atm, and/or less than or equal to about 17.5 atm. In addition or in the alternative, the pressure (at ambient temperature) of fill gas 410 in coaxial cable 400 may be, for example, greater than or equal to about 5 atm and less than or equal to about 25 atm, greater than or equal to about 10 atm and less than or equal to about 20 atm, and/or greater than or equal to about 12.5 atm and less than or equal to about 17.5 atm. In example embodiments, the pressure (at ambient temperature) of fill gas 410 in coaxial cable 400 may be approximately 15 atm.

In example embodiments, the characteristic impedance of coaxial cable 400 may be affected by the geometry of coaxial cable 400, the physical dimensions of inner conductor 402 and/or outer conductor 404, the size of gap 406, various properties of insulating dielectric material 408, the amount of insulating dielectric material 408, the type of fill gas 410, and the pressure of fill gas 410, among other factors.

The characteristic impedance of coaxial cable 400 may be greater than or equal to about 25 ohms, greater than or equal to about 30 ohms, greater than or equal to about 35 ohms, greater than or equal to about 40 ohms, greater than or equal to about 45 ohms, greater than or equal to about 50 ohms, greater than or equal to about 55 ohms, greater than or equal to about 60 ohms, greater than or equal to about 65 ohms, and/or greater than or equal to about 70 ohms. In addition or in the alternative, the characteristic impedance of coaxial cable 400 may be less than or equal to about 100 ohms, less than or equal to about 95 ohms, less than or equal to about 90 ohms, less than or equal to about 85 ohms, less than or equal to about 80 ohms, less than or equal to about 75 ohms, less than or equal to about 70 ohms, less than or equal to about 65 ohms, less than or equal to about 60 ohms, and/or less than or equal to about 55 ohms. In addition or in the alternative, the characteristic impedance of coaxial cable 400 may be, for example, greater than or equal to about 25 ohms and less than or equal to about 75 ohms, greater than or equal to about 40 ohms and less than or equal to about 60 ohms, and/or greater than or equal to about 45 ohms and less than or equal to about 55 ohms. In addition or in the alternative, the characteristic impedance of coaxial cable 400 may be, for example, greater than or equal to about 50 ohms and less than or equal to about 100 ohms, greater than or equal to about 65 ohms and less than or equal to about 85 ohms, and/or greater than or equal to about 70 ohms and less than or equal to about 80 ohms. In example embodiments, the characteristic impedance of coaxial cable 400 may be approximately 30 ohms, 50 ohms, 52 ohms, 60 ohms, 73 ohms, 75 ohms, 77 ohms, or 93 ohms. For example, the characteristic impedance of coaxial cable 400 may be greater than or equal to 70 ohms and less than or equal to 78 ohms.

Propagation of one or more signals (such signals may also be referred to, for example, as waveforms, waveform signals, waveshapes, and/or waveshape signals) in, for example, coaxial cable 400 may be associated with the energy stored in the magnetic field of the one or more signals within the distributed inductance per unit length and the energy stored in the electric field of the one or more signals within the distributed capacitance per unit length. Characteristic impedance $Z_O$ of coaxial cable 400 may be established, for example, by the values of distributed inductance per unit length L and distributed capacitance per unit length C, uniformly distributed over the length of coaxial cable 400.

The distributed inductance per unit length and/or distributed capacitance per unit length of a coaxial cable may be functions of the geometry, the physical dimensions of the electrical conductors, the distance between the electrical conductors, the type of insulating dielectric material between the electrical conductors, the quantity of insulating dielectric material between the electrical conductors, and/or other factors. The characteristic impedance $Z_O$ of coaxial cable 400 may be expressed in terms of distributed inductance per unit length L and distributed capacitance per unit length C according to Equation 1 below ($Z_O$ is in ohms, L is in henries per meter, and C is in farads per meter).

$$Z_O = \sqrt{(L/C)} \tag{1}$$

In example embodiments, characteristic impedance $Z_O$ of coaxial cable 400 may not change if the physical dimensions of inner conductor 402, the physical dimensions of outer conductor 404, and/or the size of gap 406 of coaxial cable 400 are not changed. However, a change in the dielectric constant of insulating dielectric material 408 between inner conductor 402 and outer conductor 404 may change distributed capacitance per unit length C, while distributed inductance per unit length L may remain the same. Any change in the dielectric constant of insulating dielectric material 408 may change distributed capacitance per unit length C, and thereby may change characteristic impedance $Z_O$ according to Equation 1 above.

An electrical signal requires a finite amount of time to propagate from an input end to the opposite end a cable or transmission line having insulating dielectric material between two electrical conductors (the same is true of signal propagation from the opposite end back to the input end). The velocity of propagation per unit length may be dependent upon a dielectric constant of the insulating dielectric material between the two electrical conductors, which may determine the resultant capacitance per unit length of the transmission line.

In example embodiments, insulating dielectric material 408 may determine the velocity or velocities at which one or more signals (e.g., one or more step waveshape signals and/or one or more impulse waveshape signals) propagate through coaxial cable 400 (e.g., from an input end of coaxial cable 400 to the opposite end of coaxial cable 400). Propagation velocity per unit length v may be expressed in terms of distributed inductance per unit length L and distributed capacitance per unit length C according to Equation 2 below (v is in meters per second, L is in henries per meter, and C is in farads per meter).

$$v = 1/\sqrt{(L*C)} \qquad (2)$$

The propagation velocity per unit length v also may be expressed in terms of characteristic impedance $Z_O$ and distributed capacitance per unit length C of a transmission line. Combining Equations 1 and 2 yields Equation 3 below (v is in meters per second, $Z_O$ is in ohms, and C is in farads per meter).

$$v = 1/(Z_O * C) \qquad (3)$$

A capacitor may be defined, for example, by two electrodes separated by an insulating dielectric material (e.g., solid and/or gas). An insulating dielectric material may experience polarization under the influence of an electric field developed between the two electrodes when an electric potential is applied between them (e.g., resulting in positive and negative electrodes). Polarization of the insulating dielectric material may cause a redistribution of positive and negative electrical charges within the insulating dielectric material with respect to one another, whereby the negative electric charges within the insulating dielectric material are displaced toward the positive electrode and the positive charges within the insulating dielectric material are shifted toward the negative electrode. Polarization of the insulating dielectric material between the two electrodes may couple more electric flux lines and may increase the electric flux density per unit area between the two electrodes, thereby increasing the electric charge stored in the capacitor, which results in an increased capacitance. The greater the degree to which an insulating dielectric material is polarized, the higher the value of the dielectric constant of the insulating dielectric material, which results in increased electric flux density per unit area between the two electrodes and increased capacitance.

In example embodiments, gamma flux from the nuclear reactor core may directly and/or indirectly interact with fill gas 410. This interaction may occur using mechanism(s) similar to the following. The gamma flux may interact with, for example, outer conductor 404. Such gamma ray interactions may emit energetic secondary electrons via photoelectric absorption, Compton scattering, pair production interactions, and/or other processes.

Gamma ray interactions that occur sufficiently close to an inner wall surface of outer conductor 404, which create and emit energetic secondary electrons, may allow some of the emitted energetic secondary electrons to enter gap 406. Many of these emitted energetic secondary electrons may interact with one or more atoms of fill gas 410 by completely removing and freeing electrons from the atoms of fill gas 410. Removing and freeing an electron from an atom of fill gas 410 results in ionization of the atom of fill gas 410 by creating an ion pair that includes the free electron (negative ion) and the atom of fill gas 410 with an electron totally removed (positive ion).

Energy lost by an emitted energetic secondary electron creating an ion pair from a single interaction with an atom of fill gas 410 may be a very small fraction of the total energy of the emitted energetic secondary electron. As a consequence, the emitted energetic secondary electron may lose more energy through subsequent interactions with atoms of fill gas 410 that result in the creation of many ion pairs from numerous interactions with many atoms of fill gas 410, and the formation of an ionized space charge between inner conductor 402 and outer conductor 404. Presence of an applied electrical potential between inner conductor 402 and outer conductor 404 may develop an electric field between inner conductor 402 and outer conductor 404 that causes polarization of the ionized space charge in fill gas 410.

Polarization of the ionized space charge in fill gas 410 may be accomplished by the displacement and separation of the mobile positive and negative ions within the ionized space charge that are attracted and migrate toward the oppositely charged electrode. The smaller negative ions (free electrons) may migrate at a much faster rate toward the positive electrode and leave behind the much more massive and slower-migrating positive ions (atoms of fill gas 410 with an electron totally removed). The much faster migration rate of the negative ions may cause the region of fill gas 410 in the near vicinity of the negative electrode to be much more depleted of negative ions in comparison to the much slower migrating positive ions left behind in the near vicinity of the negative electrode. Likewise, the much faster migration of the negative ions enables a much greater accumulation and abundance of negative ions in the near vicinity of the positive electrode. As a consequence, the displacement and separation of the positive and negative ions that accumulate in the near vicinity of oppositely charged electrodes may effectively polarize the ionized space charge in fill gas 410 due to the polarized distribution of the space charge ions.

The polarized distribution of the ionized space charge in fill gas 410 between the positive and negative electrodes may have the cumulative effect of coupling more electric lines and increasing the electric flux density per unit area between inner conductor 402 and outer conductor 404. Increasing the electric flux density between inner conductor 402 and outer conductor 404 may effectively increase the dielectric constant of fill gas 410 between inner conductor 402 and outer conductor 404 and, as a consequence, may increase the dielectric constant of fill gas 410, which may increase the resultant distributed capacitance per unit length C of coaxial cable 400. An increase in distributed capacitance per unit length C due to the increase of the dielectric constant of fill gas 410 may have the net effect of decreasing characteristic impedance $Z_O$ of coaxial cable 400. The greater the gamma flux level, the greater the decrease of characteristic impedance $Z_O$ of coaxial cable 400. The gamma flux level may be proportional to the power level in a nuclear reactor, particularly at or near steady-state conditions. Thus, increases in gamma flux level may result in a greater degree of decreasing characteristic impedance $Z_O$ along the length of coaxial cable 400, and decreases in gamma flux level may result in a lesser degree of decreasing characteristic impedance $Z_O$ along the length of coaxial cable 400.

Applicant notes that insulating dielectric material 408 may contribute to the separation and/or polarization. Such a contribution would tend to supplement the net effect of fill gas 410 in coaxial cable 400.

As discussed above, during power operation of a nuclear reactor, power levels typically are determined by measuring thermal neutron flux. As discussed above, during steady-state operation, gamma flux typically is proportional to thermal neutron flux. And during non-steady-state operation in which reactor power level changes slowly over time, gamma flux typically is substantially proportional to thermal neutron flux (e.g., it is generally proportional to thermal neutron flux with some time delay).

The apparatus of example embodiments may provide the ability to measure, for example, local gamma flux, equivalent local neutron flux, local reactor power level, and/or gamma flux, equivalent neutron flux, and/or reactor power level more generally.

The apparatus of example embodiments may provide additional capabilities. For example, the apparatus may predict critical rod height for a similar control rod configuration after sudden changes in power level of the nuclear reactor, such as a reactor scram. In another example, the apparatus may predict power levels for a similar control rod configuration after sudden changes in power level of the nuclear reactor, such as abnormal main steam isolation valve position(s), fast closure of turbine stop valve(s), and/or fast closure of turbine control valve(s). The accuracy of such predictions may depend on the power shape within the nuclear reactor core.

From the discussion above, it may be seen that the impedance of coaxial cable 400, disposed in the nuclear reactor core in a substantially vertical orientation, generally follows the following trends during power operation of the nuclear reactor: (a) below the nuclear reactor core—specific impedance equal to characteristic impedance; (b) at the bottom of the nuclear reactor core—specific impedance somewhat less than characteristic impedance; (c) from the bottom of the nuclear reactor core toward near the mid-core—specific impedance less than characteristic impedance and generally decreasing in a substantially continuous manner; (d) near the mid-core—specific impedance less than characteristic impedance and generally reaching a minimum value; (e) from near the mid-core toward the top of the nuclear reactor core—specific impedance less than characteristic impedance and generally increasing in a substantially continuous manner; (f) at the top of the nuclear reactor core—specific impedance somewhat less than characteristic impedance; and (g) above the nuclear reactor core—specific impedance equal to characteristic impedance.

In example embodiments, inner conductor 402 may include stainless steel. In example embodiments, outer conductor 404 may include two layers, an inner sheath and an outer sheath. In example embodiments, the inner sheath may include copper. In example embodiments, the outer sheath may include stainless steel.

In example embodiments, insulating dielectric material 408 may include silicon dioxide in powder form.

In example embodiments, fill gas 410 may be Argon gas. In example embodiments, fill gas 410 may be greater than 99% purity. In example embodiments, coaxial cable 400 may be pressurized to about 1,000 cm of Hg (at ambient temperature) with fill gas 410.

In example embodiments, the distributed capacitance per unit length may be about 30 pF/m for a 50 ohm characteristic impedance. In example embodiments, the distributed capacitance per unit length may be about 20 pF/m for a 75 ohm characteristic impedance). For example, the distributed capacitance per unit length may be less than or equal to 27 pF/ft at 1 kHz.

In example embodiments, the distributed inductance per unit length may be less than or equal to 150 nH/ft.

In example embodiments, at least one of the two or more electrical conductors may be conductors of a cable other than a coaxial cable. For example, the two or more electrical conductors may be conductors of a twisted wire pair, untwisted wire pair, twin-lead, Lecher lines, balanced line, unbalanced line, multi-conductor line, slotted line, resonant line, non-resonant line, eccentric line, ladder line, strip line, open-circuit line, short-circuit line, artificial line, tapered line, delay line, stub line, parallel line, and/or additional cables other than a coaxial cable—provided that changes in specific impedance may be measured with respect to gamma flux. The two or more electrical conductors may be, for example, electrical conductors of a transmission line. Example embodiments may comprise two or more electrical conductors of a transmission line that includes a fill gas, as discussed above, so that the gamma flux may interact with the fill gas to change the specific characteristic impedance of the transmission line.

In example embodiments, the two or more electrical conductors may allow power levels to be determined essentially on a continuous basis. In addition or in the alternative, the two or more electrical conductors may have a resolution on the order of about 1-2 inches (i.e., separate measurements of specific impedance of the two or more electrical conductors effectively may be obtained about every 1-2 inches of length along the two or more electrical conductors).

In example embodiments, at least one of the two or more electrical conductors may supplement and/or replace one or more gamma thermometers and/or TIPs. Thus, a number of improvements in the nuclear reactor may be made, such as: improving reliability of LPRM calibration; reducing the complexity of the nuclear reactor; improving the reliability of the nuclear reactor; reducing the number of penetrations in the reactor vessel; reducing the number of penetrations in the containment building; simplifying design and/or construction of the nuclear reactor; simplifying supervision, operation, and/or maintenance of the nuclear reactor; and/or reducing design, construction, operation, and/or maintenance costs of the nuclear reactor.

Figure 5:
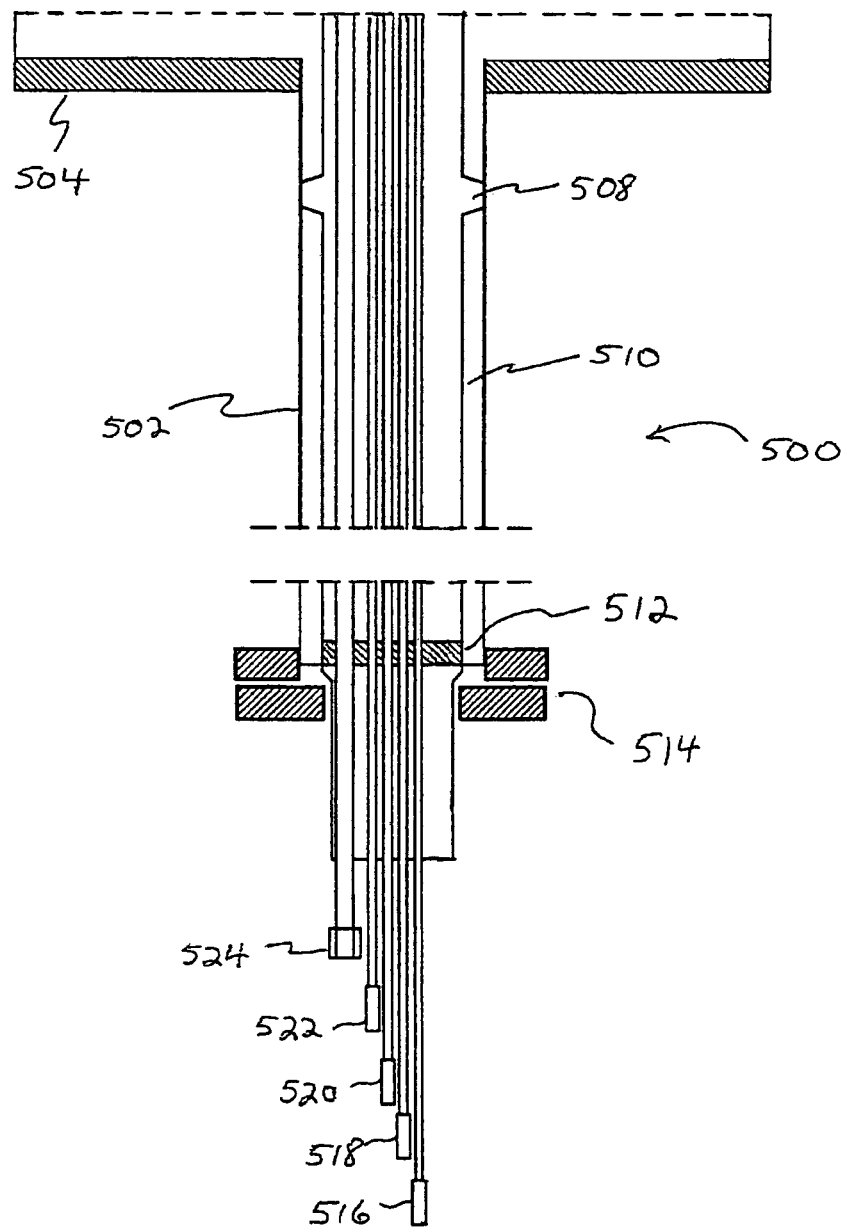
FIG. 5 is a side elevation view of an LPRM assembly according to example embodiments.

FIG. 5 is a side elevation view of LPRM assembly 500 according to example embodiments. As shown, for example, in FIG. 5, a calibration tube associated with a TIP may be removed and/or a gamma thermometer may be replaced with the apparatus of example embodiments. As shown in FIG. 5, guide tube 502 of LPRM assembly 500 may penetrate core plate 504, allowing LPRM assembly 500 access into core 506. One or more guide rings 508 of LPRM cover tube 510 may guide the insertion of LPRM assembly 500 into guide tube 502. Guide tube 502 may be sealed by gland seal 512 and/or flange 514.

LPRM assembly 500 may include, for example, four LPRM detectors (not shown) and/or five connectors. First connector 516 may connect to a first LPRM detector, second connector 518 may connect to a second LPRM detector, third connector 520 may connect to a third LPRM detector, and/or fourth connector 522 may connect to a fourth LPRM detector.

One or more of first connector 516, second connector 518, third connector 520, and fourth connector 522 may be a connector manufactured by the LEMO company, based in Switzerland, and known as a LEMO plug or LEMO receptacle. For example, one or more of first connector 516, second connector 518, third connector 520, and fourth connector 522 may be a size 1 LEMO receptacle.

Fifth connector 524 may connect to the apparatus of example embodiments of LPRM assembly 500. For example, fifth connector 524 may connect to an electrically conductive cable (not shown), such as a coaxial cable. Fifth connector 524 may be, for example, a size 1 or 3 LEMO receptacle.

In LPRM assembly 500, the first, second, third, and fourth LPRM detectors may be disposed in a substantially vertical arrangement. The substantially vertical arrangement may include spacing between the first, second, third, and fourth LPRM detectors. The spacing may be of the same size, or two or more different sizes. The substantially vertical arrangement may be, for example, approximately the same in each LPRM assembly 500. The substantially vertical arrangement may allow the first, second, third, and fourth LPRM detectors to monitor neutron flux (typically thermal neutron flux) at four different heights (or locations) in core 506. The four different heights (or locations) may be, for example, approximately the same in each LPRM assembly 500.

In example embodiment, one or more calibration tubes associated with a TIP may be removed and/or one or more gamma thermometers may be replaced with one or more of the apparatuses discussed above. Removing all of the calibration tubes may allow the removal of the entire TIP device, allowing fewer penetrations of the primary containment and/or the reactor vessel, simplifying reactor operations, reducing maintenance and/or repair costs, and reducing radiation exposure and contamination issues. Similarly, removing all of the gamma thermometers may simplify reactor operations, reduce maintenance and/or repair costs, and reduce radiation exposure and contamination issues.

In addition or in the alternative, one or more of the apparatuses discussed above may supplement one or more calibration tubes associated with a TIP. In addition or in the alternative, one or more of the apparatuses discussed above may supplement one or more gamma thermometers.

The one or more signal devices may be disposed outside a primary containment of the nuclear reactor. For example, the one or more signal devices may be at least partly disposed inside or outside the primary containment in the reactor building.

In example embodiments, at least one of the one or more signal devices may be adapted to generate and/or apply one or more signals (e.g., incident signals) to the two or more electrical conductors, may be adapted to receive one or more signals (e.g., reflected signals) from the two or more electrical conductors, or may be adapted to apply one or more signals (e.g., incident signals) to the two or more electrical conductors and receive one or more signals (e.g., reflected signals) from the two or more electrical conductors (for example, a signal device may be adapted to generate and apply an incident signal to the input of two electrical conductors and may be adapted to receive two or more reflected signals from the two electrical conductors). Thus, the one or more signal devices may function, for example, as one or more signal generators. In addition or in the alternative, the one or more signal devices may function, for example, as one or more signal receivers.

In example embodiments, at least one of the one or more signal devices may include a time-domain reflectometer ("TDR"). The TDR may employ a signal generator (e.g., a waveform or waveshape signal generator) that generates and/or applies an incident signal with a fast leading edge (i.e., a fast rise time) to the input end of, for example, a transmission line under examination. The TDR may monitor the incident signal(s) and reflected signal(s) (e.g., echo or echoes) with respect to time between the incident signal(s) and reflected signal(s) using a wide band oscilloscope in an arrangement resembling a closed-loop radar system. For example, a TDR may generate and/or apply one incident signal and/or may receive two or more reflected signals related to that one incident signal (for example, a TDR may generate and apply an incident signal to the input of two electrical conductors and may receive two or more reflected signals related to that incident signal from the two electrical conductors). TDR examinations may require an incident signal with a fast leading edge—a leading edge made up of very high frequency components—and a wide band oscilloscope to enhance and achieve the necessary resolution of signal voltage amplitudes and timing between the incident fast leading edge signals and the reflected signals (e.g., echoes). An incident fast leading edge signal applied to the input end of the transmission line may travel along the length of the transmission line at the propagation velocity of the transmission line. The characteristic impedance of the transmission line may be the impedance presented at the input end of a transmission line of infinite length and may be constant over the entire length of the transmission line.

Any change of the transmission line characteristic impedance that exists along the length of the transmission line may be an impedance mismatch condition. The impedance mismatch condition may cause some portion of the energy of the incident signal to be reflected back in the reverse direction from the location of the impedance mismatch condition as a reflected signal (e.g., an impedance mismatch reflected signal) that travels back toward the input end of the transmission line at the propagation velocity of the transmission line. The voltage amplitude of the total reflected signal travelling back to the input end of the transmission line is the algebraic sum of the incident signal voltage amplitude and the reflected signal voltage amplitude from the location of the impedance mismatch condition that exists along the length of the transmission line. An increase of impedance above the initial characteristic impedance of the transmission line as the result of an impedance mismatch condition may cause some portion of the energy of the incident fast leading edge signal to create a reflected signal of positive polarity amplitude, with respect to the amplitude of the incident signal, to be reflected back to the input end of the transmission line. Likewise, a decrease of impedance below the initial characteristic impedance of the transmission line as the result of an impedance mismatch condition may cause some portion of the energy of the incident fast leading edge signal to create a reflected signal of negative polarity, with respect to the amplitude of the incident signal, to be reflected back to the input end of the transmission line. The amplitude and polarity of the reflected signal may be used to determine the value of the impedance mismatch condition(s) that exists at the location along the length of the transmission line. The shape and polarity of the reflected signal may be used to diagnose the type of impedance mismatch condition(s) that exists along the length of the transmission line. The time between the application of the incident signal to the input end of the transmission line and the receipt of the reflected signal back to the input end of the transmission line may be used to establish the physical location of the impedance mismatch condition that exists along the length of the transmission line.

In example embodiments, the TDR may have an impedance greater than or equal to about 40 ohms and less than or equal to about 120 ohms. For example, the TDR may have an impedance of about 50 ohms.

A TDR may apply an incident fast leading edge signal to the input end of, for example, a transmission line in order to propagate toward the opposite end of the transmission line. If the transmission line has a uniform characteristic impedance over the entire length of the transmission line, the incident fast leading edge signal may propagate along the entire length of the transmission line and none of the energy of the incident fast leading edge signal may be reflected back to the input end of the transmission line. The opposite end of the transmission line may not be terminated, which may create an open circuit mismatch condition at the opposite end of the transmission line, and therefore may cause virtually all of the energy of the arriving incident fast leading edge signal to be reflected back to the input end of the transmission line. However, during power operation of a nuclear reactor, a transmission line in the nuclear reactor core experiencing varying gamma flux levels proportional to the reactor power level may not have the original uniform characteristic impedance. The varying gamma flux levels may cause proportional impedance mismatch conditions along the transmission line that may result in a decrease of the characteristic impedance in proportion to the varying gamma flux levels. The varying decreasing characteristic impedance changes occurring along the transmission line may reflect varying proportional portions of the incident fast leading edge signal at the corresponding locations of the varying gamma flux levels.

In example embodiments, coaxial cable 400 experiencing varying gamma flux levels in the nuclear reactor core may develop proportionally varying impedance mismatch conditions. The varying impedance mismatch conditions that may result in proportionally varying specific characteristic impedances of coaxial cable 400 that may tend to be less than the original characteristic impedance of coaxial cable 400. As a result, the varying portions of energy of the incident fast leading edge signal that created the energy signal reflected back to the input end of coaxial cable 400 may be proportional to the gamma flux levels and/or may have a negative polarity with respect to the amplitude of the incident signal.

In example embodiments, the following measurements were performed to establish the specific characteristic impedance of coaxial cable 400: (1) voltage amplitude of the incident fast leading edge signal ($V_1$) applied to the input end of coaxial cable 400; (2) voltage amplitude of the total reflected signal ($V_{TR}$, i.e., voltage amplitude of the total reflected signal, which is the algebraic sum of the voltage amplitude of the incident fast leading edge signal and the voltage amplitude of the reflected signal); and (3) the time difference between the time when the incident fast leading edge signal was applied to the input end of coaxial cable 400 and the time when the total reflected signal arrived back at the input end of coaxial cable 400.

$$V_I = \text{voltage amplitude of incident signal} \tag{4}$$

$$V_{TR} = \text{voltage amplitude of total reflected signal} \tag{5}$$

The voltage amplitude of the incident fast leading edge signal, $V_I$, may be subtracted from the voltage amplitude of the total reflected signal, $V_{TR}$, in order to establish the voltage amplitude of the reflected signal, $V_R$.

$$V_R = (\text{voltage amplitude of total reflected signal}) - (\text{voltage amplitude of incident signal}) \tag{6}$$

$$V_R = V_{TR} - V_I \tag{7}$$

$$V_R = \text{voltage amplitude of reflected signal} \tag{8}$$

In addition, the specific characteristic impedance, $Z_S$ (in ohms), at the location of the mismatch condition along the transmission line may be calculated as a function of the original characteristic impedance of the transmission line, $Z_O$ (in ohms), the voltage amplitude of the incident fast leading edge signal, $V_I$, and the voltage amplitude of the reflected signal, $V_R$, according to Equation 10 below.

$$Z_O = \text{original characteristic impedance in ohms} \tag{9}$$

$$Z_S = (Z_O) * [(V_I + V_R)/(V_I - V_R)] \tag{10}$$

$$Z_S = \text{specific characteristic impedance in ohms} \tag{11}$$

The time difference in nanoseconds (ns) between the time, $t_O$, when the incident fast leading edge signal was applied to the input end of coaxial cable 400 and the time, $t_R$, when the total reflected signal arrived back at the input end of coaxial cable 400 may establish the time interval for signal propagation from the location of the impedance mismatch condition along the length of coaxial cable 400.

In addition, the location of an impedance mismatch condition along the length of coaxial cable 400 with respect to the input end of coaxial cable 400 may be established by multiplying the time difference (in nanoseconds) by the propagation velocity of coaxial cable 400 (in meters per second) and dividing by two (2). The division by two is necessary because the portion of energy of the incident fast leading edge signal that is reflected back by the impedance mismatch condition located along the length of coaxial cable 400 makes a round trip from the input end of coaxial cable 400 to the location of the impedance mismatch condition and then back again to the input end of coaxial cable 400.

The incident fast leading edge signal applied to the input end of coaxial cable 400 requires a finite time to propagate a unit length of distance towards the opposite end of coaxial cable 400. However, the additional capacitance created between the two conductors of coaxial cable 400 by exposure to gamma flux levels may increase the distributed capacitance per unit length of coaxial cable 400. The increased distributed capacitance of coaxial cable 400 per unit length not only may decrease the original characteristic impedance $Z_O$, but also may decrease the propagation velocity per unit length v (Equation 2) of both the incident fast leading edge signal and the reflected signal created by impedance mismatch conditions. A decrease of the propagation velocity per unit length v may cause coaxial cable 400 to appear electronically longer in length in comparison to the actual physical length of coaxial cable 400. Therefore, the electronic location of an impedance mismatch condition should be corrected for the total amount of signal propagation delay incrementally accumulated in both directions for all previously occurring impedance mismatch conditions that exist along coaxial cable 400 in order to establish the actual physical location of the impedance mismatch condition.

Figure 6:
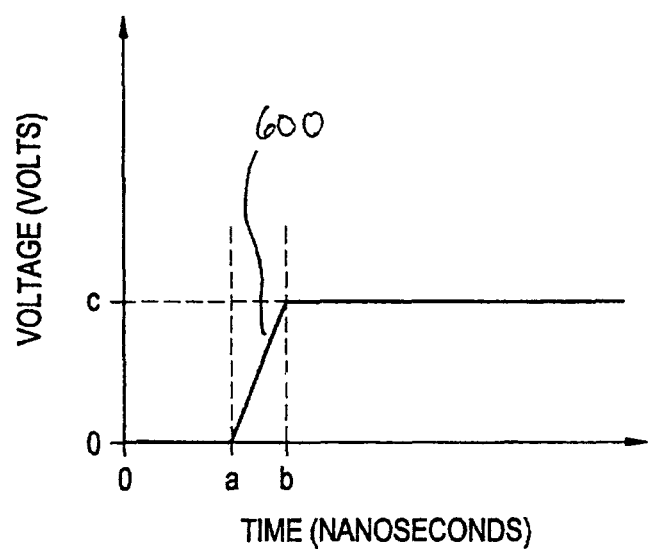
FIG. 6 is a graph depicting a step waveshape signal according to example embodiments.

In example embodiments, the incident fast leading edge signal applied to the input end of coaxial cable 400 may have a rise time of approximately one (1) nanosecond or less in order to achieve sufficient resolution of the impedance mismatch locations along the length of coaxial cable 400. The incident fast leading edge signal may comprise, for example, a step waveshape signal. Such a step waveshape signal may maintain, for example, a substantially constant voltage amplitude over a period of time. The step waveshape signal may be, for example, a square wave. FIG. 6 is a graph depicting step waveshape signal 600 according to example embodiments. As shown, for example, in FIG. 6, step waveshape signal 600 may have peak-to-peak voltage amplitude c and/or rise time b-a (i.e., the time difference between time b and time a, or time b minus time a). Peak-to-peak voltage amplitude c may be given, for example, in units of volts. Rise time b-a may be given, for example, in units of nanoseconds. FIG. 6 may show an idealized approximation of step waveshape signal 600.

Peak-to-peak voltage amplitude c of the incident fast leading edge signal applied to the input end of coaxial cable 400 may be greater than or equal to about 0.25 volts, greater than or equal to about 0.5 volts, greater than or equal to about 1 volt, greater than or equal to about 2 volts, greater than or equal to about 3 volts, greater than or equal to about 4 volts, greater than or equal to about 5 volts, greater than or equal to about 7.5 volts, and/or greater than or equal to about 10 volts. In example embodiments, the incident fast leading edge signal applied to the input end of coaxial cable 400 may have a peak-to-peak voltage amplitude c of approximately 0.25 volts.

Rise time b-a of the incident fast leading edge signal applied to the input end of coaxial cable 400 may be greater than or equal to about 0.1 nanoseconds, greater than or equal to about 0.2 nanoseconds, greater than or equal to about 0.3 nanoseconds, greater than or equal to about 0.4 nanoseconds, greater than or equal to about 0.5 nanoseconds, greater than or equal to about 0.75 nanoseconds, and/or greater than or equal to about 1 nanosecond. In example embodiments, the incident fast leading edge signal applied to the input end of coaxial cable 400 may have a rise time b-a of approximately one (1) nanosecond.

Figure 7:
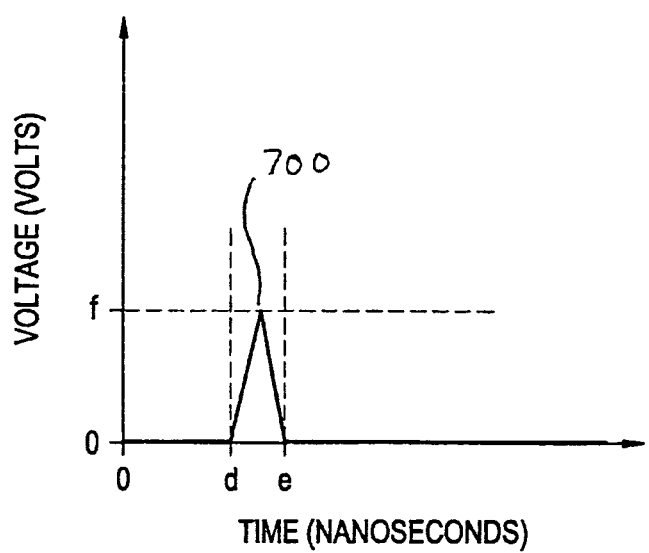
FIG. 7 is a graph depicting an impulse waveshape signal according to example embodiments.

The incident fast leading edge signal may comprise, for example, an impulse waveshape signal. FIG. 7 is a graph depicting impulse waveshape signal 700 according to example embodiments. As shown, for example, in FIG. 7, an impulse waveshape signal 700 may have peak-to-peak voltage amplitude f and/or pulse width e-d (i.e., the time difference between time e and time d, or time e minus time d). Peak-to-peak voltage amplitude f may be given, for example, in units of volts. Pulse width e-d may be given, for example, in units of nanoseconds. FIG. 7 may show an idealized approximation of impulse waveshape signal 700.

Peak-to-peak voltage amplitude f of the incident fast leading edge signal applied to the input end of coaxial cable 400 may be greater than or equal to about 0.25 volts, greater than or equal to about 0.5 volts, greater than or equal to about 1 volt, greater than or equal to about 2 volts, greater than or equal to about 3 volts, greater than or equal to about 4 volts, greater than or equal to about 5 volts, greater than or equal to about 7.5 volts, and/or greater than or equal to about 10 volts. In example embodiments, the incident fast leading edge signal applied to the input end of coaxial cable 400 may have a peak-to-peak voltage amplitude f of approximately 0.25 volts.

Pulse width e-d of the incident fast leading edge signal applied to the input end of coaxial cable 400 may be greater than or equal to about 0.1 nanoseconds, greater than or equal to about 0.2 nanoseconds, greater than or equal to about 0.3 nanoseconds, greater than or equal to about 0.4 nanoseconds, greater than or equal to about 0.5 nanoseconds, greater than or equal to about 0.75 nanoseconds, and/or greater than or equal to about 1 nanosecond. In example embodiments, the incident fast leading edge signal applied to the input end of coaxial cable 400 may have a pulse width e-d of approximately one (1) nanosecond.

Data from step waveshape signal 600 may be used to calculate relative reactor power distribution. Additionally, it may be possible to calculate relative reactor power distribution using data from impulse waveshape signal 700.

The analyzer may be disposed outside a primary containment of the nuclear reactor. For example, the analyzer may be at least partly disposed outside the primary containment, but inside the reactor building. In another example, at least part of the analyzer may be disposed inside the primary containment.

In example embodiments, the analyzer may be adapted to determine power level in the nuclear reactor using at least one of the one or more incident fast leading edge signals applied to the input end of coaxial cable 400 and at least one of the one or more received signals.

Figure 8:
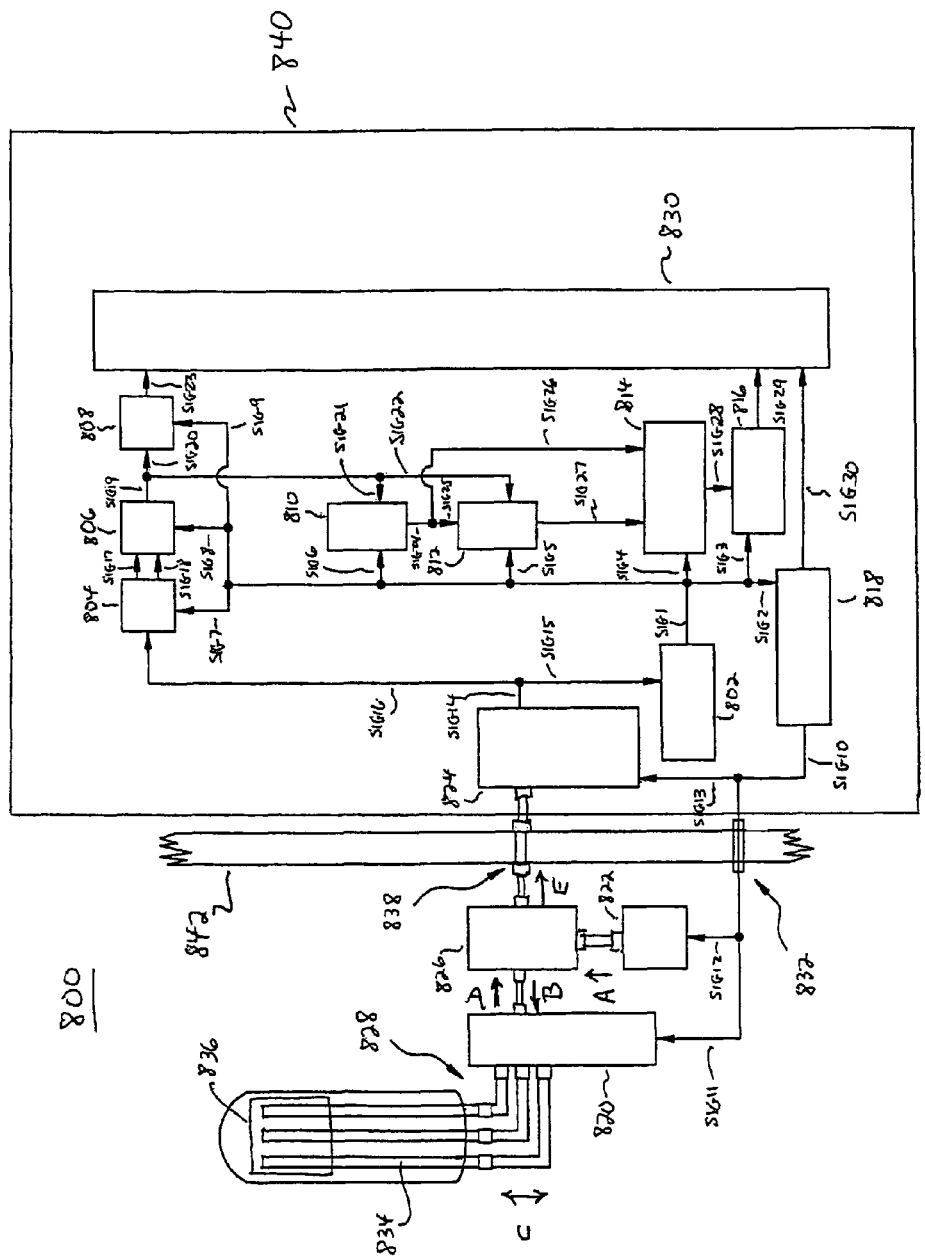
FIG. 8 is a block diagram of an analysis system according to example embodiments.

FIG. 8 is a block diagram of analysis system 800 according to example embodiments. Analysis system 800 may include, for example, timing control device 802, extraction and/or first calculation device 804, second calculation device 806, third calculation device 808, fourth calculation device 810, fifth calculation device 812, sixth calculation device 814, seventh calculation device 816, selection and/or control device 818, switch 820, signal generator 822 (e.g., a waveform or waveshape signal generator), signal amplifier 824, impedance-matching network 826, transmission line(s) 828, and/or computer 830.

Other components depicted in FIG. 8 include, for example, first primary containment penetration 832, two or more electrical conductors 834, core 836, and second primary containment penetration 838. In FIG. 8, first primary containment penetration 832 and second primary containment penetration 838 are shown as penetrating primary containment wall 842.

FIG. 8 also shows arrows A-E. First arrow A may indicate, for example, a direction of the incident fast leading edge signal. Second arrow B may indicate, for example, a direction of the incident fast leading edge signal. Third arrow C may indicate, for example, directions of the incident fast leading edge signal and the reflected signal. Fourth arrow D may indicate, for example, a direction of the incident fast leading edge signal and the reflected signal. Fifth arrow E may indicate, for example, a direction of the incident fast leading edge signal and the reflected signal.

Analyzer 840 may include, for example, one or more of timing control device 802, extraction and/or first calculation device 804, second calculation device 806, third calculation device 808, fourth calculation device 810, fifth calculation device 812, sixth calculation device 814, seventh calculation device 816, selection and/or control device 818, and/or computer 830.

Timing control device 802 may send signal SIG1 to various components of analysis system 800, such as extraction and/or first calculation device 804, second calculation device 806, third calculation device 808, fourth calculation device 810, fifth calculation device 812, sixth calculation device 814, seventh calculation device 816, and/or selection and/or control device 818. Signal SIG1 may include one or more sub-signals, such as signal SIG2, signal SIG3, signal SIG4, signal SIG5, signal SIG6, signal SIG7, signal SIG8, and/or signal SIG9. One or more of the signal SIG1 sub-signals may be the same as signal SIG1. In addition or in the alternative, one or more of the signal SIG1 sub-signals may be the same as each other. In example embodiments, signal SIG1 may be referred to as "start time and/or incremental timing control signal SIG1".

Selection and/or control device 818 may receive signal SIG2 from timing control device 802. Signal SIG2 may cause selection and/or control device 818 to send signal SIG10 to various components of analysis system 800, such as switch 820, signal generator 822, and/or signal amplifier 824. Signal SIG10 may include one or more sub-signals, such as signal SIG11, signal SIG12, and/or signal SIG13. One or more of the signal SIG10 sub-signals may be the same as signal SIG10. In addition or in the alternative, one or more of the signal SIG10 sub-signals may be the same as each other. In example embodiments, signal SIG10 may be referred to as "detector selection and/or start signal SIG10".

Switch 820 may receive signal SIG11 from selection and/or control device 818 via first primary containment penetration 832. Signal SIG11 may cause switch 820 to select two or more electrical conductors 834 at least partly disposed within core 836.

Signal generator 822 may receive signal SIG12 from selection and/or control device 818 via first primary containment penetration 832. Signal SIG12 may cause signal generator 822 to generate one or more incident fast leading edge signals (not shown), such as one or more step waveshape signals and/or one or more impulse waveshape signals.

Signal amplifier 824 may receive signal SIG13 from selection and/or control device 818, as discussed below.

Signal generator 822 may send the one or more incident fast leading edge signals to the two or more electrical conductors 834 via impedance-matching network 826, switch 820, and/or transmission line(s) 828 (for example, signal generator 822 may send an incident fast leading edge signal to the input of two electrical conductors 834 via impedance-matching network 826, switch 820, and/or transmission line(s) 828). The one or more reflected signals may return to impedance-matching network 826 via transmission line(s) 828 and/or switch 820 (for example, two or more reflected signals related to the incident fast leading edge signal may return to impedance-matching network 826 via transmission line(s) 828 and/or switch 820). The one or more incident fast leading edge signals and/or reflected signals may travel from impedance-matching network 826 via second primary containment penetration 838 to signal amplifier 824 (for example, the incident fast leading edge signal and the two or more reflected signals related to the incident fast leading edge signal may travel from impedance-matching network 826 via second primary containment penetration 838 to signal amplifier 824). Signal amplifier 824 may amplify and/or store the one or more incident fast leading edge signals and/or reflected signals (for example, signal amplifier 824 may amplify and store the incident fast leading edge signal and the two or more reflected signals).

In possible coordination with signal SIG13 from selection and/or control device 818, signal amplifier 824 may send signal SIG14 to various components of analysis system 800, such as extraction and/or first calculation device 804 and/or timing control device 802. Signal SIG14 may include one or more sub-signals, such as signal SIG15 and/or signal SIG16. One or both of the signal SIG14 sub-signals may be the same as signal SIG14. In addition or in the alternative, the signal SIG14 sub-signals may be the same as each other. In example embodiments, signal SIG16 may be referred to as "TDR signal SIG16".

Timing control device 802 may receive signal SIG15 from signal amplifier 824. In example embodiments, signal SIG15 may provide feedback on the operation of portions of analysis system 800 to timing control device 802.

Extraction and/or first calculation device 804 may receive signal SIG16 from signal amplifier 824. In example embodiments, extraction and/or first calculation device 804 may extract voltage amplitude of the incident fast leading edge signal $V_O$ from signal SIG16 and/or may calculate voltage amplitude of the reflected signal $V_R$ based on signal SIG16. In example embodiments, the extractions and/or calculations may be performed as discussed above.

In possible coordination with signal SIG7 from timing control device 802, extraction and/or first calculation device 804 may send signal SIG17 (representing voltage amplitude of the incident fast leading edge signal $V_O$) and/or signal SIG18 (representing voltage amplitude of the reflected signal $V_R$) to second calculation device 806. Based on the original characteristic impedance $Z_O$, voltage amplitude of the incident fast leading edge signal $V_O$, and/or voltage amplitude of the reflected signal $V_R$, second calculation device 806 may calculate specific characteristic impedance $Z_S$ for various locations along the length of the two or more electrical conductors 834 of coaxial cable 400 at least partly disposed within core 836. In addition or in the alternative, second calculation device 806 may use, for example, a look-up table to determine specific characteristic impedance $Z_S$. In example embodiments, the calculations may be performed as discussed above.

In possible coordination with signal SIG8 from timing control device 802, second calculation device 806 may send signal SIG19 (representing specific characteristic impedance $Z_S$) to various components of analysis system 800, such as third calculation device 808, fourth calculation device 810, and/or fifth calculation device 812. Signal SIG19 may include one or more sub-signals, such as signal SIG20, signal SIG21, and/or signal SIG22. One or more of the signal SIG19 sub-signals may be the same as signal SIG19. In addition or in the alternative, one or more of the signal SIG19 sub-signals may be the same as each other.

Third calculation device 808 may receive signal SIG20 (representing specific characteristic impedance $Z_S$) from second calculation device 806. In possible coordination with signal SIG9 from timing control device 802, third calculation device 808 may use signal SIG20 to calculate specific reactor power level for various locations along the length of the two or more electrical conductors 834 of coaxial cable 400 at least partly disposed within core 836. In addition or in the alternative, third calculation device 808 may use, for example, a look-up table to determine specific reactor power level (e.g., local gamma flux level).

In possible coordination with signal SIG9 from timing control device 802, third calculation device 808 may send signal SIG23 (representing specific reactor power level for various locations along the length of the two or more electrical conductors 834 of coaxial cable 400 at least partly disposed within core 836) to computer 830.

Fourth calculation device 810 may receive signal SIG21 (representing specific characteristic impedance $Z_S$) from second calculation device 806. In possible coordination with signal SIG6 from timing control device 802, fourth calculation device 810 may use signal SIG21 to calculate specific distributed capacitance per unit length $C_S$ of coaxial cable 400. In addition or in the alternative, fourth calculation device 810 may use, for example, a look-up table to determine specific distributed capacitance per unit length $C_S$ of coaxial cable 400. In example embodiments, the calculations may be performed as discussed above.

In possible coordination with signal SIG6 from timing control device 802, fourth calculation device 810 may send signal SIG24 (representing specific distributed capacitance per unit length $C_S$) to various components of analysis system 800, such as fifth calculation device 812 and/or sixth calculation device 814. Signal SIG24 may include one or more sub-signals, such as signal SIG25 and/or signal SIG26. One or both of the signal SIG24 sub-signals may be the same as signal SIG24. In addition or in the alternative, the signal SIG24 sub-signals may be the same as each other.

Fifth calculation device 812 may receive signal SIG22 (representing specific characteristic impedance $Z_S$) from second calculation device 806 and/or signal SIG25 (representing specific distributed capacitance per unit length $C_S$) from fourth calculation device 810. In possible coordination with signal SIG5 from timing control device 802, fifth calculation device 812 may use signals SIG22 and/or SIG25 to calculate specific propagation velocity factor per unit length $v_S$. In addition or in the alternative, fifth calculation device 812 may use, for example, a look-up table to determine specific propagation velocity factor per unit length $v_S$. In example embodiments, the calculations may be performed as discussed above.

In possible coordination with signal SIG5 from timing control device 802, fifth calculation device 812 may send signal SIG27 (representing specific propagation velocity factor per unit length $v_S$) to sixth calculation device 814.

Sixth calculation device 814 may receive signal SIG26 (representing specific distributed capacitance per unit length $C_S$) from fourth calculation device 810 and/or signal SIG27 (representing specific propagation velocity factor per unit length $v_S$) from fifth calculation device 812.

In possible coordination with signal SIG4 from timing control device 802, sixth calculation device 814 may use signals SIG26 and/or SIG27 to calculate time with specific incremental time correction Δt. In addition or in the alternative, sixth calculation device 814 may use, for example, a look-up table to determine time with specific incremental time correction Δt. In example embodiments, the calculations may be performed as discussed above.

In possible coordination with signal SIG4 from timing control device 802, sixth calculation device 814 may send signal SIG28 (representing time with specific incremental time correction Δt) to seventh calculation device 816.

Seventh calculation device 816 may receive signal SIG28 (representing time with specific incremental time correction Δt) from sixth calculation device 814. In possible coordination with signal SIG3 from timing control device 802, seventh calculation device 816 may use signal SIG28 to calculate specific locations along the length of the two or more electrical conductors 834 of coaxial cable 400 at least partly disposed within core 836. In addition or in the alternative, seventh calculation device 816 may use, for example, a look-up table to determine specific locations along the length of the two or more electrical conductors 834 of coaxial cable 400 at least partly disposed within core 836. In example embodiments, the calculations may be performed as discussed above.

In possible coordination with signal SIG3 from timing control device 802, seventh calculation device 816 may send signal SIG29 (representing specific core location) to computer 830.

Selection and/or control device 818 may send signal SIG30 (representing the selected two or more electrical conductors 834 of coaxial cable 400) to computer 830.

In part, computer 830 may coordinate various components of analysis system 800 and/or perform the calculations described in this application for operating nuclear reactors and for determining power levels in the nuclear reactors. Computer 830 may process data to yield, for example, distributed power results. Computer 830 also may record data, post-process data, and/or display data.

First primary containment penetration 832 and second primary containment penetration 838 may be combined into a single penetration.

In part because virtually all components and materials inside the primary containment may be subject to at least some degradation due to aging resulting from temperature, neutron flux, and/or gamma flux, one or more of switch 820, signal generator 822, and impedance-matching network 826 may be disposed outside of the primary containment. In this situation, some loss of sensitivity and/or resolution may result (i.e., the resolution may be on the order of about 1-3 inches).

Switch 820 may be, for example, an electronic and/or mechanical switch, as is known to a PHOSITA. In addition or in the alternative, switch 820 may be, for example, a coaxial switch, as is known to a PHOSITA.

One or more of signal generator 822, signal amplifier 824, and impedance-matching network 826 may be included in a TDR (not shown).

In example embodiments, an incident fast leading edge signal was applied to the input end of coaxial cable 400 in order to obtain the following voltage amplitudes: (1) the voltage amplitude of the incident fast leading edge signal $V_I$; and (2) the voltage amplitude of the total reflected signal $V_{TR}$ from impedance mismatch conditions.

The voltage amplitude of the above listed signals were first directly applied to Equation 7 to find the voltage amplitude of the reflected signal $V_R$ relative to the voltage amplitude of the incident fast leading edge signal $V_I$. Then the resultant voltage amplitudes were directly applied to Equation 10 to find the specific characteristic impedance $Z_O$ as a function of the original characteristic impedance $Z_S$.

An alternative approach may include applying a very short duration (0.2 ns to 2 ns duration) impulse waveshape signal to the input end of coaxial cable 400 in order to obtain voltage measurements of the incident fast leading edge signal and the reflected signal from the impedance mismatch condition. The complex reflected signal voltage amplitude and shape may be dependent on the time derivative (d/dt) of the incident signal voltage that is the first derivative relating to the rate of change of the impedance mismatch condition. Such an alternative approach to determine a nuclear reactor power profile is possible, but may require more signal processing and calculations. Obtaining the nuclear reactor power profile may be easier and/or less complex to achieve using an incident fast leading edge signal.

In example embodiments, the power level determined in a nuclear reactor may include a steady-state power level and/or a non-steady-state power level. The steady-state power level and/or the non-steady-state power level may include one or more estimated power levels. The non-steady-state power level may be, for example, a transient power level.

In example embodiments, the power level may be determined over one or more partial or full dimensions of the nuclear reactor core in any of several directional orientations. In example embodiments, the power level may be determined over one or more partial or full widths of the nuclear reactor core. In example embodiments, the power level may be determined over one or more sections of the nuclear reactor core.

In example embodiments, one or more one-dimensional profiles of the power level in the nuclear reactor may be developed. The one or more one-dimensional profiles may include, for example, one or more vertical profiles of the power level, one or more horizontal profiles of the power level, one or more radial profiles of the power level, and/or one or more diagonal profiles.

In example embodiments, one or more two-dimensional profiles of the power level in the nuclear reactor may be developed. The one or more two-dimensional profiles may include, for example, one or more vertical versus horizontal profiles of the power level, one or more vertical versus radial profiles of the power level, one or more vertical cross-section profiles of the power level, one or more horizontal cross-section profiles of the power level, one or more radial cross-section profiles of the power level, and/or one or more diagonal cross-section profiles.

In example embodiments, one or more two-dimensional or three-dimensional profiles of the power level in the nuclear reactor may be developed. The one or more two-dimensional or three-dimensional profiles may include, for example, vertical profile of the power level, a horizontal profile of the power level, a radial profile of the power level, and/or a diagonal profile of the power level. For example, a two-dimensional profile may include a radial profile of the power level in the nuclear reactor in the form of a radial cross-section, possibly taken along a row or diagonal of LPRM detectors and/or LPRM assemblies 500. In another example, a two-dimensional profile may include a vertical profile and a horizontal profile of the power level in the nuclear reactor in the form of a vertical cross-section, possibly taken along a row or diagonal of LPRM detectors and/or LPRM assemblies 500.

In example embodiments, the numerous LPRM detectors (e.g., 256) and the resolution of the apparatus (e.g., on the order of about 1-2 inches) may allow the power level in the nuclear reactor to be determined in numerous different ways.

Figure 9A:
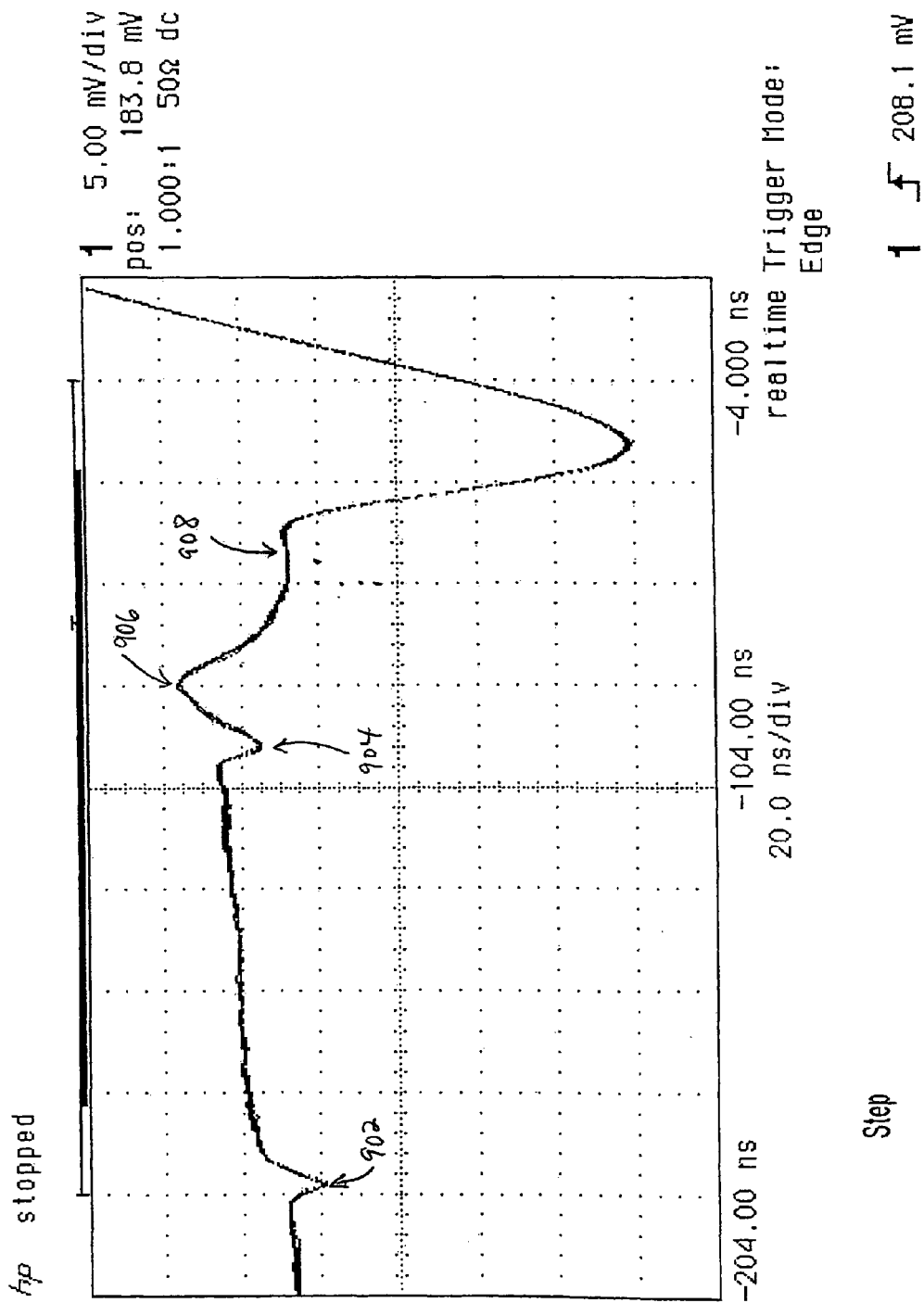
FIGS. 9A and 9B are graphs of voltage amplitude of a reflected signal versus time for a nuclear reactor operating at approximately 92% power.

FIG. 9A is a graph of voltage amplitude of the reflected signal $V_R$ (in units of millivolts) versus time (in units of nanoseconds) for a nuclear reactor operating at approximately 92% power (measured reactor power level was reported as 92.4%). In FIG. 9A, the voltage amplitude versus time values were measured at a specific core location on Day 1. The incident fast leading edge signal was a step waveshape signal, with a peak-to-peak voltage amplitude equal to or about 0.25 volts and a rise time equal to or about 1 nanosecond. Reference character 902 may indicate, for example, a connection where a cable enters the bottom of the reactor vessel. Reference character 904 may approximate, for example, a splice where the material of the electrical conductors changes from copper to stainless steel (as may observed in FIG. 9A, the splice of the electrical conductors may have a relatively lengthy impact on the reflected signal(s), so that the point at which the cable enters the bottom of the nuclear reactor core and/or the point at which the cable connects to a WRNM detector may have to be calculated). The splice may be located, for example, approximately 2 feet below the bottom of the nuclear reactor core. The splice may be inherently capacitive, may cause a temporary impedance disturbance, and/or may create a large amplitude impedance mismatch reflection signal whose electrical effect may extend a short distance beyond and/or above the physical location of the splice. Such a temporary impedance disturbance caused by the splice may interfere with the actual impedance mismatch reflection signals developed in the nuclear reactor core before the splice impedance mismatch reflection signal gradually decays to a negligible value at approximately 0.2 m above the bottom of the nuclear reactor core. Reference character 906 may approximate, for example, where the cable enters the nuclear reactor core. Reference character 908 may approximate, for example, where the cable connects to the WRNM detector.

Figure 9B:
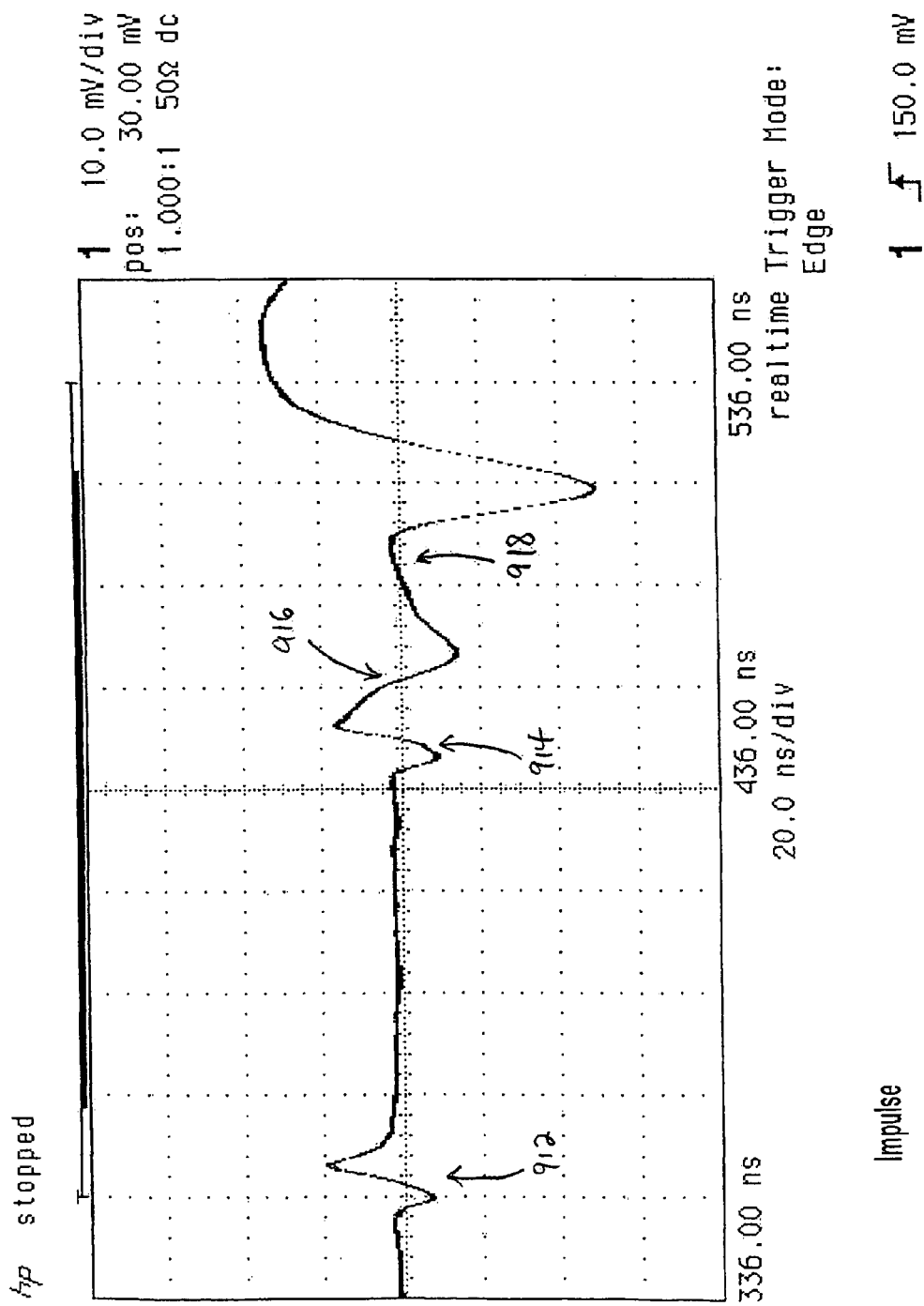

FIG. 9B is a graph of voltage amplitude of the reflected signal $V_R$ (in units of millivolts) versus time (in units of nanoseconds) for the nuclear reactor operating at approximately 92% power (measured reactor power level was reported as 92.4%). In FIG. 9B, the voltage amplitude versus time values were measured at the specific core location, also on Day 1. The fast-rise-time signal was an impulse waveshape signal, with a peak-to-peak voltage amplitude equal to or about 0.25 volts and a rise time equal to or about 1 nanosecond. Reference character 912 may indicate, for example, a connection where a cable enters the bottom of the reactor vessel. Reference character 914 may indicate, for example, a splice where the material of the electrical conductors changes from copper to stainless steel (as may observed in FIG. 9B, the splice of the electrical conductors may have a relatively lengthy impact on the reflected signal, so that the point at which the cable enters the bottom of the nuclear reactor core and/or the point at which the cable connects to a WRNM detector may have to be calculated). The splice may be located, for example, approximately 2 feet below the bottom of the nuclear reactor core. The splice may be inherently capacitive, may cause a temporary impedance disturbance, and/or may create a large amplitude impedance mismatch reflection signal whose electrical effect may extend a short distance beyond and/or above the physical location of the splice. Such a temporary impedance disturbance caused by the splice may interfere with the actual impedance mismatch reflection signals developed in the nuclear reactor core before the splice impedance mismatch reflection signal gradually decays to a negligible value at approximately 0.2 m above the bottom of the nuclear reactor core. Reference character 916 may indicate, for example, where the cable enters the nuclear reactor core. Reference character 918 may indicate, for example, where the cable connects to the WRNM detector.

Figure 9C:
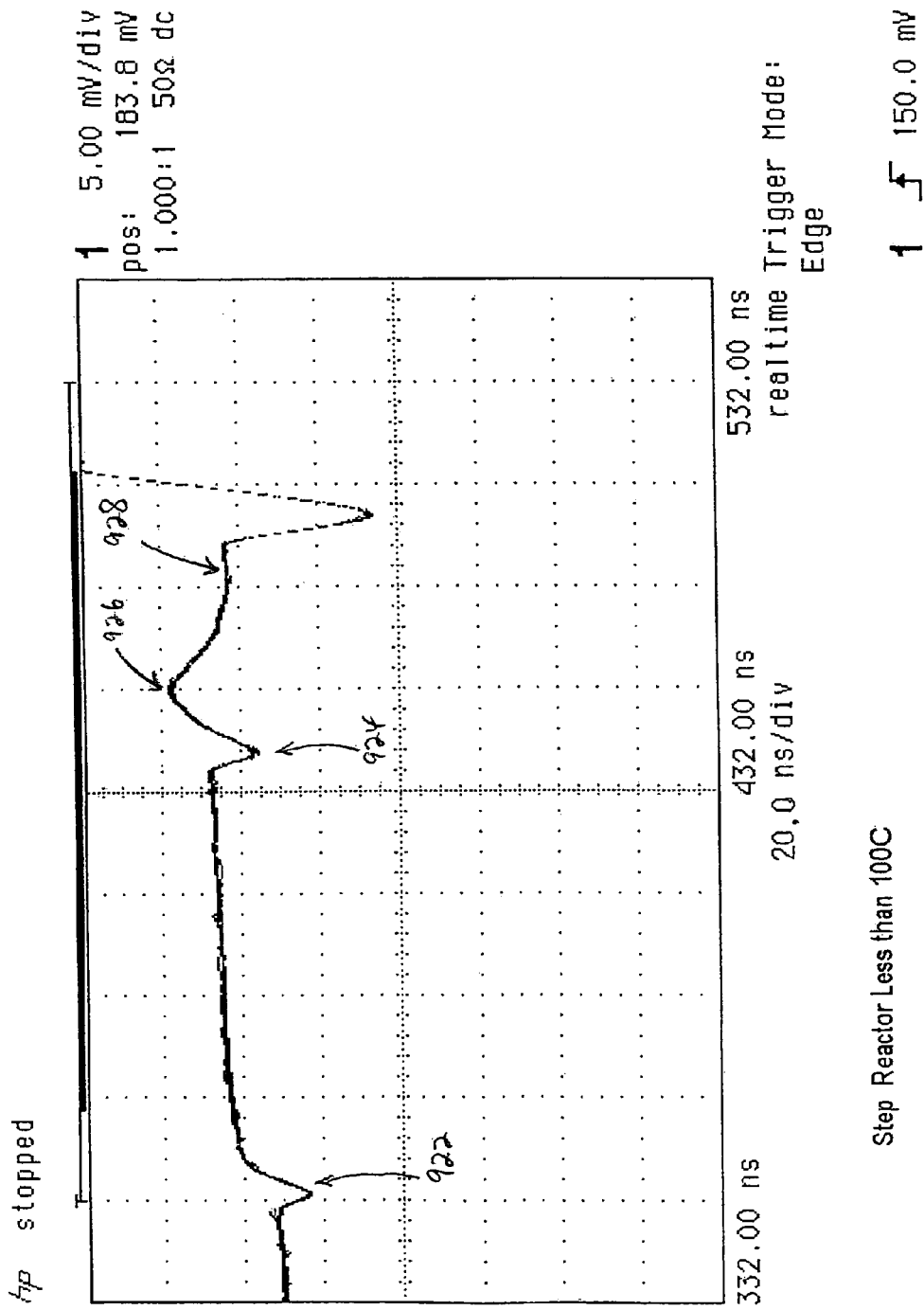
FIGS. 9C and 9D are graphs of voltage amplitude of the reflected signal versus time for the nuclear reactor of FIGS. 9A and 9B in a shutdown condition, less than 100° C.

FIG. 9C is a graph of voltage amplitude of the reflected signal $V_R$ (in units of millivolts) versus time (in units of nanoseconds) for the nuclear reactor in a shutdown condition, less than 100° C. In FIG. 9C, the voltage amplitude versus time values were measured at the specific core location on Day 2. The fast-rise-time signal was a step waveshape signal, with a peak-to-peak voltage amplitude equal to or about 0.25 volts and a rise time equal to or about 1 nanosecond. Reference character 922 may indicate, for example, a connection where a cable enters the bottom of the reactor vessel. Reference character 924 may indicate, for example, a splice where the material of the electrical conductors changes from copper to stainless steel (as may observed in FIG. 9C, the splice of the electrical conductors may have a relatively lengthy impact on the reflected signal, so that the point at which the cable enters the bottom of the nuclear reactor core and/or the point at which the cable connects to a WRNM detector may have to be calculated). The splice may be located, for example, approximately 2 feet below the bottom of the nuclear reactor core. The splice may be inherently capacitive, may cause a temporary impedance disturbance, and/or may create a large amplitude impedance mismatch reflection signal whose electrical effect may extend a short distance beyond and/or above the physical location of the splice. Such a temporary impedance disturbance caused by the splice may interfere with the actual impedance mismatch reflection signals developed in the nuclear reactor core before the splice impedance mismatch reflection signal gradually decays to a negligible value at approximately 0.2 m above the bottom of the nuclear reactor core. Reference character 926 may indicate, for example, where the cable enters the nuclear reactor core. Reference character 928 may indicate, for example, where the cable connects to the WRNM detector.

Figure 9D:
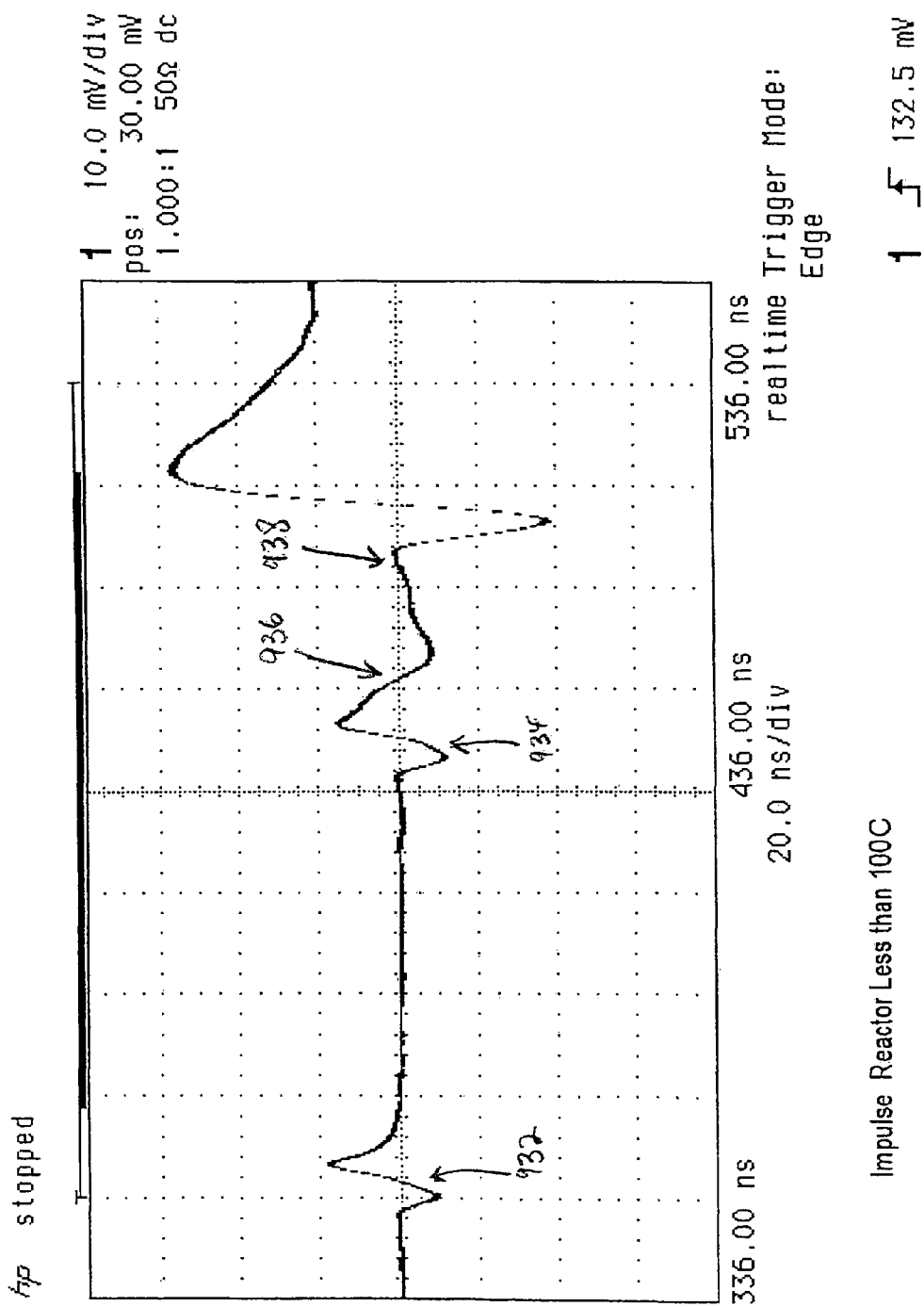

FIG. 9D is a graph of voltage amplitude of the reflected signal $V_R$ (in units of millivolts) versus time (in units of nanoseconds) for the nuclear reactor in a shutdown condition, less than 100° C. In FIG. 9D, the voltage amplitude versus time values were measured at the specific core location, also on Day 2. The fast-rise-time signal was an impulse waveshape signal, with a peak-to-peak voltage amplitude equal to or about 0.25 volts and a rise time equal to or about 1 nanosecond. Reference character 932 may indicate, for example, a connection where a cable enters the bottom of the reactor vessel. Reference character 934 may indicate, for example, a splice where the material of the electrical conductors changes from copper to stainless steel (as may observed in FIG. 9D, the splice of the electrical conductors may have a relatively lengthy impact on the reflected signal, so that the point at which the cable enters the bottom of the nuclear reactor core and/or the point at which the cable connects to a WRNM detector may have to be calculated). The splice may be located, for example, approximately 2 feet below the bottom of the nuclear reactor core. The splice may be inherently capacitive, may cause a temporary impedance disturbance, and/or may create a large amplitude impedance mismatch reflection signal whose electrical effect may extend a short distance beyond and/or above the physical location of the splice. Such a temporary impedance disturbance caused by the splice may interfere with the actual impedance mismatch reflection signals developed in the nuclear reactor core before the splice impedance mismatch reflection signal gradually decays to a negligible value at approximately 0.2 m above the bottom of the nuclear reactor core. Reference character 936 may indicate, for example, where the cable enters the nuclear reactor core. Reference character 938 may indicate, for example, where the cable connects to the WRNM detector.

The horizontal axes of FIGS. 9A-9D indicate a time offset and/or voltage offset in order to enhance the resolution of the TDR signature on an oscilloscope. A helical coil (with associated inductance) may be placed, for example, at the connection between the cable and the WRNM detector in order to allow for thermal expansion. The WRNM detector is a combination pulse/ionization chamber, so it may act as a capacitive impedance mismatch condition. As may be observed, the capacitive effect of the WRNM detector on the TDR signature is more significant at approximately 92% reactor power than when shutdown.

Although the data of FIGS. 9A and 9B was taken at approximately 92% reactor power and the data of FIGS. 9C and 9D was taken in a shutdown condition, less than 100° C., this technique (e.g., impedance mismatch technique) is believed to yield accurate results that are scalable with reactor power level. And although the data of FIGS. 9A-9D was taken on a WRNM cable, this technique should be applicable to LPRM cables and other cables, as well.

FIG. 10 is a table listing the results of relative power calculations for the nuclear reactor operating at approximately 92% power, with Node Values of Relative Reactor Power (arbitrary units) calculated in the near vicinity of the specific core location on Day 1 (e.g., at the nuclear reactor for which the calculations were made, TIP locations and WRNM cable locations were not identical). Nodes are counted up from the bottom of the nuclear reactor core. Each node has a height of approximately 14.72 centimeters. The WRNM detector is located at approximately the level corresponding to $21^{st}$ node, with its centerline approximately 3.0175 meters above the bottom of the nuclear reactor core. A normalization factor of 566, corresponding to a position approximately 1.0304 m from the bottom of the nuclear reactor core at approximately 92% reactor power, was applied to obtain the Calculated Node Values of Relative Reactor Power (arbitrary units) using a process computer associated with a core monitoring package. Impedance measurements (e.g., impedance mismatch measurements) according to example embodiments may yield data that may be compared, for example, to such a relative reactor vertical power distribution.

Figure 11:
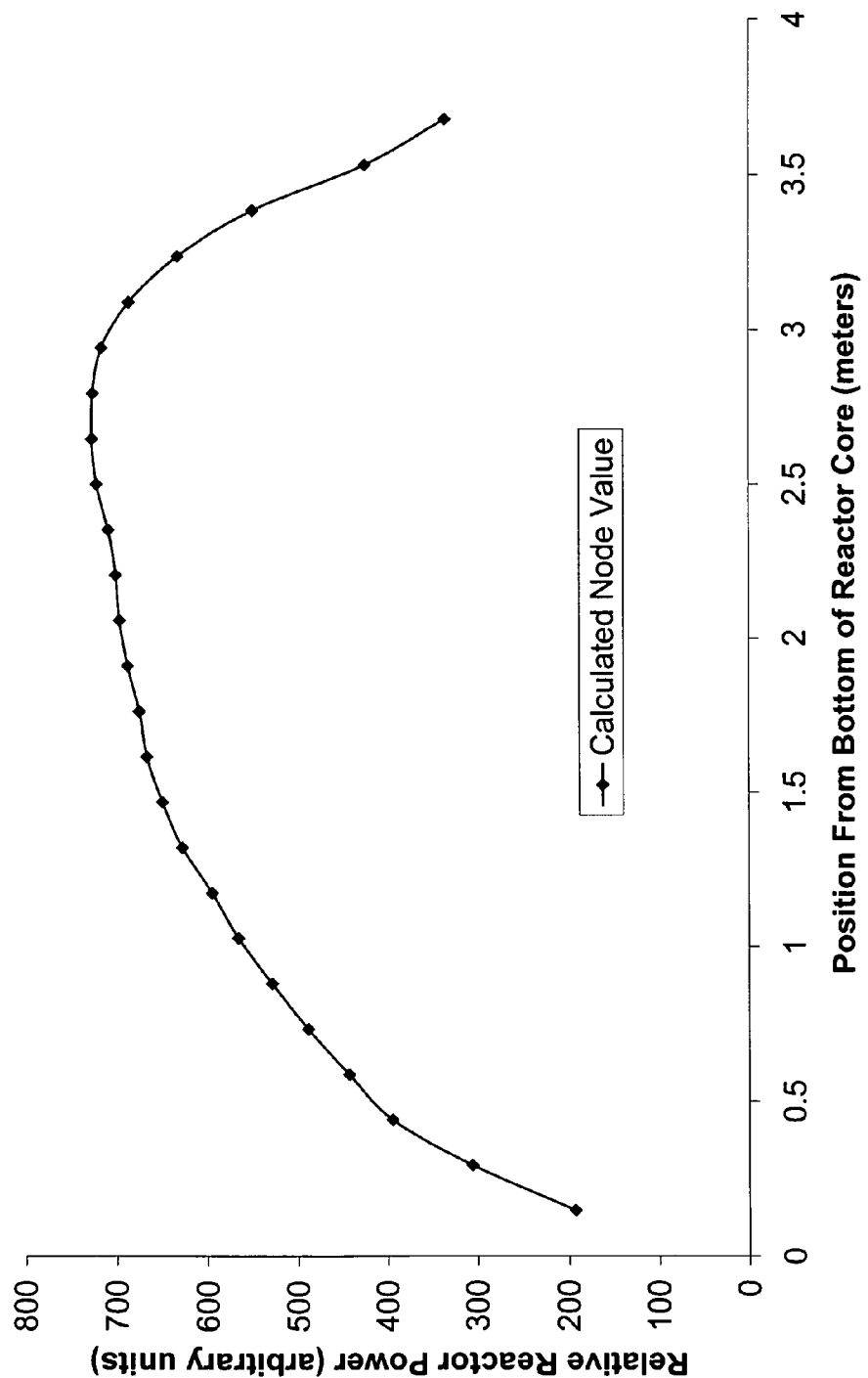
FIG. 11 is a graph showing the data of FIG. 10.

FIG. 11 is a graph displaying the data of FIG. 10.

FIG. 12 is a table listing the results of relative vertical power calculations for the same nuclear reactor based on example embodiments. In implementing Equation 10, $Z_O$ and $V_1$ may be known values. $V_{TR}$ may be obtained from FIGS. 9A and 9C (in order to remove any effects not due to gamma flux, such as existing permanent impedance mismatch conditions, voltage values in FIG. 9C—reactor in a shutdown condition—at given positions from the bottom of the nuclear reactor core may be subtracted from voltage values in FIG. 9A—reactor operating at approximately 92% power—at corresponding positions from the bottom of the nuclear reactor core on a point-for-point basis). Then $V_R$ may be calculated using Equation 7 (algebraically subtracting $V_I$ from $V_{TR}$). $Z_S$ may be calculated using the values of $Z_O$, $V_I$, and $V_R$, according to Equation 10.

Column 2 of FIG. 12 shows values of $Z_S$ calculated in this manner. Column 3 of FIG. 12 shows values of $\Delta Z_S$ calculated relative to $Z_S$ at a position starting from the bottom of the nuclear reactor core. Column 4 of FIG. 12 shows an Adjusted Values of Relative Reactor Power (arbitrary units) normalized to 566 at a position approximately 1.0 m from the bottom of the nuclear reactor core. The other Adjusted Values of Relative Reactor Power (arbitrary units) in column 4 of FIG. 12 were calculated by multiplying 566 by the ratio of $\Delta Z_S$ at a given position to $\Delta Z_S$ at the 1.0 m position, according to Equation 12 below.

$$\text{Adjusted Value}_r = 566 \times [(\Delta Z_S)_x / (\Delta Z_S)_{1.0\,m}] \tag{12}$$

Figure 13:
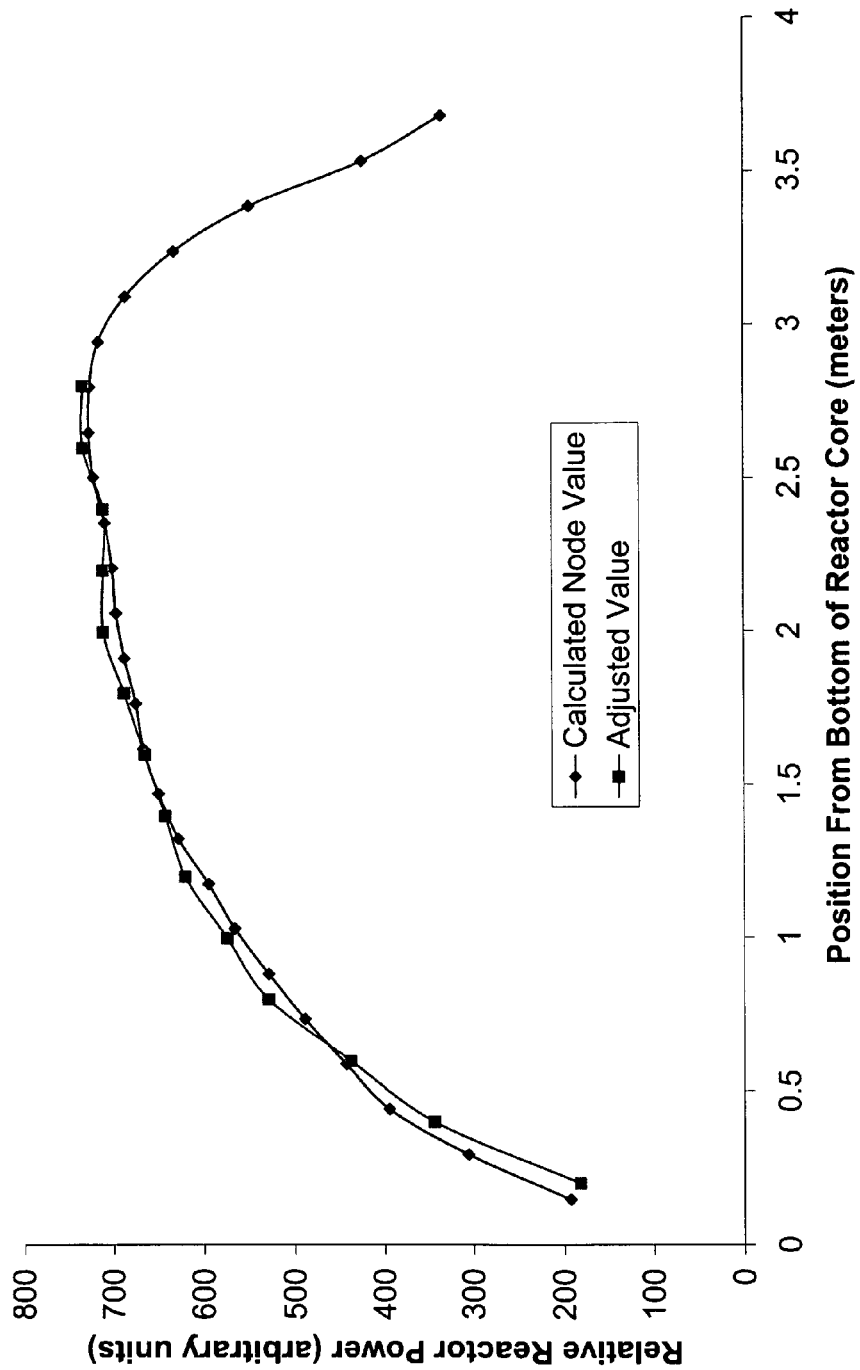
FIG. 13 is a graph showing the data of FIGS. 10 and 12 plotted together, comparing vertical power profiles.

FIG. 13 is a graph displaying the data of FIGS. 10 and 12 plotted together, comparing vertical power profiles, and normalized at approximately 1 m from the bottom of the nuclear reactor core for comparison of peaks and/or slope changes. As may be observed, the relative reactor power distribution of FIG. 12 closely tracks and agrees with the relative reactor vertical power distributions of FIG. 11.

Other types of interpolation to determine Adjusted Values of Relative Reactor Power (arbitrary units) in FIGS. 12 and 13 may be used. For example, integration may be used to find the total area (e.g., total relative reactor power) under the Adjusted Value curve in FIG. 13, the total relative reactor power may be normalized to a desired value, and/or the Adjusted Values of Relative Reactor Power (arbitrary units) may be determined based on the normalization. The accuracy of the Adjusted Values of Relative Reactor Power (arbitrary units) determined based on such an integration technique may depend on the number and/or distribution of data samples on which the integration is based (e.g., the number and/or distribution of positions from the bottom of the nuclear reactor core for which data is available).

A dedicated cable or transmission line with no splice in the near vicinity of the bottom of the nuclear reactor core and of sufficient length to continuously extend to a location above the top of the nuclear reactor core may enable impedance mismatch reflection signals to be developed over the entire height of the nuclear reactor core without interference from other signals.

Reactor core power data may be measured with a TIP, comparing the data to the reactor vertical power distribution calculated by a reactor core physics model (e.g., a software program or programs modeling reactor core performance based on numerous factors), and adjusting the measured power distribution to match the vertical power distribution from the model. Because direct measurements may not be available at the location of the coaxial cable (e.g., the precise radial location), predicted local gamma TIP and neutron TIP measurements for this location may be calculated using the core physics model. The vertical power distribution in the near vicinity of the coaxial cable may be calculated as described above. The vertical power distributions from the core physics model and from the coaxial cable may be normalized to the same arbitrary value at an elevation, for example, 1.0 meters above the bottom of the active fuel.

In example embodiments, methods of determining power level in a nuclear reactor may include measuring impedance values of two or more electrical conductors disposed in the nuclear reactor and using the measured impedance values to determine the power level. The power level may be, for example, a steady-state power level. For example, the power level may include one or more local power levels and/or power distributions.

In example embodiments, impedance values may include one or more of characteristic impedance, input impedance, and changes in impedance between an input end of the two or more electrical conductors of a cable or transmission line and the opposite end of the two or more electrical conductors of a cable or transmission line.

In example embodiments, measuring impedance values may include one or more of applying one or more incident signals to the two or more electrical conductors of a cable or transmission line, receiving one or more reflected signals from the two or more electrical conductors of a cable or transmission line, and analyzing at least one of the one or more applied incident signals and at least one of the one or more received reflected signals in order to measure the impedance values. At least one of the one or more applied incident signals may include, for example, a step waveshape signal. At least one of the one or more applied incident signals may include, for example, an impulse waveshape signal.

In example embodiments, analyzing at least one of the one or more applied incident signals and at least one of the one or more received reflected signals may include one or more of measuring a time of applying at least one of the one or more applied incident signals, measuring a time of receiving at least one of the one or more received reflected signals, and measuring a difference between the time of applying the at least one of the one or more applied incident signals and the time of receiving the at least one of the one or more received reflected signals.

In example embodiments, analyzing at least one of the one or more applied incident signals and at least one of the one or more received reflected signals may include one or more of measuring a voltage amplitude of at least one of the one or more applied incident signals, measuring a voltage amplitude of at least one of the one or more received reflected signals, and measuring a difference between the voltage amplitude of the at least one of the one or more applied incident signals and the voltage amplitude of the at least one of the one or more received reflected signals.

In example embodiments, analyzing at least one of the one or more applied incident signals and at least one of the one or more received reflected signals may include one or more of measuring a rate of change of a voltage amplitude of at least one of the one or more applied incident signals, measuring a rate of change of a voltage amplitude of at least one of the one or more received reflected signals, and measuring a difference between the rate of change of the voltage amplitude of the at least one of the one or more applied incident signals and the rate of change of the voltage amplitude of the at least one of the one or more received reflected signals.

In example embodiments, using the measured impedance values to determine the power level may include developing a one-dimensional profile of the power level. The one-dimensional profile may include, for example, a vertical profile of the power level, a horizontal profile of the power level, or a radial profile of the power level.

In example embodiments, using the measured impedance values to determine the power level may include developing a two-dimensional profile of the power level. The two-dimensional profile may include, for example, a vertical profile of the power level, a horizontal profile of the power level, and/or a radial profile of the power level.

In example embodiments, using the measured impedance values to determine the power level may include developing a three-dimensional profile of the power level. The three-dimensional profile may include, for example, a vertical profile of the power level, a horizontal profile of the power level, and/or a radial profile of the power level.

The apparatuses discussed above may be used for operating nuclear reactors. For example, the apparatuses may be used to calibrate other instrumentation of the nuclear reactor, to calculate time from startup and/or time until shutdown, to calculate fuel usage, and/or to plan for fuel shifting and/or fuel loading.

In addition or in the alternative, the apparatuses may be used to control one or more of inlet temperature, feed temperature, Boron concentration, control rod height, control rod patterns, shutdown capability, flow control valves, bypass flow, external recirculation flow, and speed of recirculation pumps.

In addition or in the alternative, the apparatuses may be used for shaping reactor power distribution.

In addition or in the alternative, the apparatuses may be used to provide inputs more generally to the reactor protection system and/or the rod control system.

In example embodiments, systems for determining power level in a nuclear reactor may include one or more of the apparatuses discussed above. In such systems, for example, at least one of the two or more electrical conductors of a cable or transmission line may be disposed in a core of the nuclear reactor. The systems may be used to calibrate other instrumentation of the nuclear reactor.

In example embodiments, a nuclear reactor may include one or more of the apparatuses discussed above. In example embodiments, a nuclear reactor may include one or more of the systems discussed above.

In example embodiments, the determined power levels may be used for operating the nuclear reactor. For example, the determined power levels may be used to calibrate other instrumentation of the nuclear reactor, such as the LPRM detectors.

As discussed above, LPRM detectors require periodic calibration due to burnout associated with exposure to the high radiation environment of the nuclear reactor core. In addition to calibrating the LPRM detectors, the apparatuses and methods of the present application may be used to directly or indirectly calibrate other instrumentation of the nuclear reactor using the determined power level.

In example embodiments, methods of operating a nuclear reactor may include measuring impedance values of two or more electrical conductors disposed in the nuclear reactor, and using the measured impedance values to determine parameters of the nuclear reactor. The parameters may include, for example, one or more of local fluence of ionizing particles, local fuel bundle power, overall fuel bundle power, Peak Linear Heat Generation Rate (PLHGR) for a fuel rod, PLHGR for a fuel bundle, Critical Power Ratio (CPR) for a fuel bundle, and margin to Departure from Nucleate Boiling (DNB) for a fuel bundle. In addition or in the alternative, the parameters may include, for example, one or more of: one or more reactor protection system trip setpoints, one or more reactor protection system alarm setpoints, and one or more reactor protection system warning setpoints. In addition or in the alternative, the parameters may include, for example, one or more of an operating envelope, control rod programming, reactivity control programming, and core flow programming.

While example embodiments have been particularly shown and described, it will be understood by a PHOSITA that various changes in form and details may be made in the example embodiments without departing from the spirit and scope of the present invention as defined by the following claims.

What is claimed is:

1. An apparatus, comprising:
    two or more electrical conductors configured to be at least partially disposed in a nuclear reactor;
    an analyzer configured to determine electrical impedance values of the two or more electrical conductors based on (i) at least one signal applied to the two or more electrical conductors, and (ii) at least one reflected signal received from the two or more conductors, wherein a decrease in the electrical impedance values is proportional to an increase in gamma flux within the nuclear reactor; and
    the analyzer configured to determine a power level in the nuclear reactor based on the determined electrical impedance values by determining a difference between a rate of change of a voltage amplitude of the at least one applied signal and a rate of change of a voltage amplitude of the at least one received signal.

2. The apparatus of claim 1, wherein the two or more electrical conductors are disposed completely within a core of the nuclear reactor.

3. The apparatus of claim 1, wherein the two or more electrical conductors are part of a coaxial cable.

4. The apparatus of claim 3, wherein the coaxial cable comprises:
    an inner conductor;
    an outer conductor;
    insulating dielectric material between the inner and outer conductors; and
    fill gas.

5. The apparatus of claim 4, wherein the insulating dielectric material comprises inorganic material.

6. The apparatus of claim 4, wherein the fill gas comprises noble gas.

7. The apparatus of claim 4, wherein the insulating dielectric and the fill gas are both non-polarized.

8. The apparatus of claim 1, further comprising:
    one or more signal devices configured to apply and receive the signals to and from the two or more conductors.

9. The apparatus of claim 8, wherein at least one of the one or more signal devices comprises a time-domain reflectometer ("TDR").

10. The apparatus of claim 1, wherein a velocity of propagation of the at least one signal applied to the electrical conductors, and the at least one reflected signal received from the electrical conductors, decreases in proportion to gamma flux.

11. A nuclear reactor, comprising:
    the apparatus of claim 1.

12. A system for determining power level in a nuclear reactor, comprising:
    a nuclear reactor;
    two or more electrical conductors configured to be at least partially disposed in a core of the nuclear reactor;
    an analyzer configured to determine electrical impedance values of the two or more electrical conductors based on (i) at least one signal applied to the two or more conductors, and (ii) at least one reflected signal received from the two or more conductors, wherein a decrease in the electrical impedance values is proportional to an increase in gamma flux within the nuclear reactor; and
    the analyzer configured to determine a power level in the nuclear reactor based on the determined electrical impedance values by determining a difference between a rate of change of a voltage amplitude of the at least one applied signal and a rate of change of a voltage amplitude of the at least one received signal.

13. The system of claim 12, further comprising:
    a control device, configured to calibrate other instrumentation of the nuclear reactor based on the determined power levels.

* * * * *